US006263335B1

(12) United States Patent
Paik et al.

(10) Patent No.: US 6,263,335 B1
(45) Date of Patent: *Jul. 17, 2001

(54) INFORMATION EXTRACTION SYSTEM AND METHOD USING CONCEPT-RELATION-CONCEPT (CRC) TRIPLES

(75) Inventors: Woojin Paik; Elizabeth D. Liddy; Jennifer Heverin Liddy; Ian Harcourt Niles, all of Syracuse; Eileen E. Allen, Clinton, all of NY (US)

(73) Assignee: Textwise LLC, Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/280,228

(22) Filed: Mar. 29, 1999

Related U.S. Application Data

(63) Continuation of application No. 08/795,658, filed on Feb. 6, 1997, now Pat. No. 6,076,088.
(60) Provisional application No. 60/015,512, filed on Apr. 16, 1996, and provisional application No. 60/011,369, filed on Feb. 9, 1996.

(51) Int. Cl.[7] ................................................ G06F 17/30
(52) U.S. Cl. ................................................ 707/5
(58) Field of Search ................................ 707/3, 4, 5, 6

(56) References Cited

U.S. PATENT DOCUMENTS

| 5,148,541 | | 9/1992 | Lee et al. ........................... 707/2 |
|---|---|---|---|
| 5,175,814 | * | 12/1992 | Anick et al. ..................... 345/384 |
| 5,301,109 | | 4/1994 | Landauer et al. ..................... 704/9 |
| 5,385,556 | * | 1/1995 | Hedin et al. ......................... 707/4 |
| 5,386,556 | | 1/1995 | Hedin et al. ......................... 707/4 |
| 5,418,948 | * | 5/1995 | Turtle ................................... 707/4 |
| 5,418,951 | | 5/1995 | Damashek ............................ 707/5 |
| 5,794,050 | | 8/1998 | Dahlgren et al. ................... 717/8 |

OTHER PUBLICATIONS

Liddy et al. "DR–LINK System: Phase I Summary" Tipster: Proceedings of the First Workshop, conference date Sep. 1993, pp. 93–112.*
Liddy et al. "DR–LINK Linguistic–Conceptual Approach to Document Detection" Nov. 1992 TREC–1 pp. 113–130.*
Liddy et al., "DR–LINK System: Phase I Summary," Tipster: Proceedings of the First Workshop, Conference Date Sep. 1993, pp. 93–112.
Liddy, et al., "DR–LINK Linguistic–Conceptual Approach to Document Detection," Proceedings of First Text Retrival Conference (TREC–1), Spring 1993, pp. 113–130.
Liddy et al., "An Overview of DR–LINK and Its Approach to Document Filtering," Proceedings of the ARPA Workshop on Human Language Technology, Princeton, New Jersey, Mar. 21–24, 1993, pp. 358–362.
Liddy et al., "Development, Implementation and Testing of a Discourse Model for Newspaper Texts," Proceedings of the ARPA Workshop on Human Language Technology, Princeton, New Jersey, Mar. 21–24, 1993, pp. 1–6.
Liddy et al., "DR–LINK: A System Update for TRBC–2," Proceedings of Second Text Retrival Conference (TREC–2), Aug. 31–Sep. 2, 1993, pp. 1–15.

(List continued on next page.)

Primary Examiner—Jack M. Choules
(74) Attorney, Agent, or Firm—Townsend and Townsend and Crew LLP

(57) ABSTRACT

An information extraction system that allows users to ask questions about documents in a database, and responds to queries by returning possibly relevant information which is extracted from the documents. The system is domain-independent, and automatically builds its own subject knowledge base. It can be applied to any new corpus of text with quick results, and no requirement for lengthy manual input. For this reason, it is also a dynamic system which can acquire new knowledge and add it to the knowledge base immediately by automatically identifying new names, events, or concepts.

20 Claims, 12 Drawing Sheets

OTHER PUBLICATIONS

Liddy, "Development and Implementation of a Discourse Model for Newspaper Texts," Proceedings of the AAAI Symposium on Empirical Method in Discourse Interpretation and Generation, Stanford, California, Dec. 14–17, 1993, pp. 1–6.

Liddy et al., "An Alternative Representation for Documents and Queries," Proceedings of the 14th National Online Meeting, 1993, pp. 279–284.

Weiner et al., "Intelligent Text Processing, and Intelligence Tradecraft," The Journal of Association for Global Strategic Intelligence (AGSI), Jul. 1995, pp. 1–8.

Liddy et al., "Text Categorization for Multiple Users Based on Semantic Features from a Machine–Readable Dictionary," ACM Transactions on Information Systems, vol. 12, No. 3, Jul. 1994, pp. 278–295.

Liddy et al., "Document Retreival Using Linguistic Knowledge," Proceedings of the RIAO 1994 Conference, Oct. 11–13, 1994, pp. 106–114.

Liddy et al., "Detection, Generation, and Expansion of Complex Nominals," Proceedings of the Workshop on Compound Nouns: Multilingual Aspects of Nominal Composition, Dec. 2–3, 1994, Geneva, Switzerland, pp. 14–18.

Liddy, "Development and Implementation of a Discourse Model for Newspaper Texts," Proceedings of the ARPA Workshop on Human Language Technology, Princeton, New Jersey, Mar. 21–24, 1995, pp. 80–84.

Liddy, et al., "A Natural Language Text Retrieval System with Relevance Feedback," Proceedings of the 16th National Online Meeting, May 2–6, 1995, pp. 259–261.

Liddy, "The Promise fo Natural Language Processing for Competitive Intelligence," Proceedings of 10th International Conference of the Society of Competitive Intelligence Professionals, May 4–5, 1995, pp. 328–342.

Paik et al., "Interpretation of Proper Nouns for Information Retrieval," Proceedings of the ARPA Workshop on Human Lanuage Technology, Princeton, New Jersey, Mar. 21–24, 1993, pp. 1–5.

Paik et al, "Categorizing and Standardizing Proper Nouns for Efficient Information Retrieval," Corpus Processing for Lexicon Acquisition, MIT Press, Cambridge, Massachusetts, 1995, pp. 1–10.

Paik et al., "Chronological Information Extraction System (CIES)," Proceedings of the Dagstuhl on Summarizing Text for Intelligent Communication, Saarbrukon, Germany, 1995, pp. 1–5.

Croft et al., "Applications of Multilingual Text Retrieval," Proceedings of the 29th Annual Hawaii International Conference on System Sciences, 1996, vol. 5, pp. 98–107.

* cited by examiner

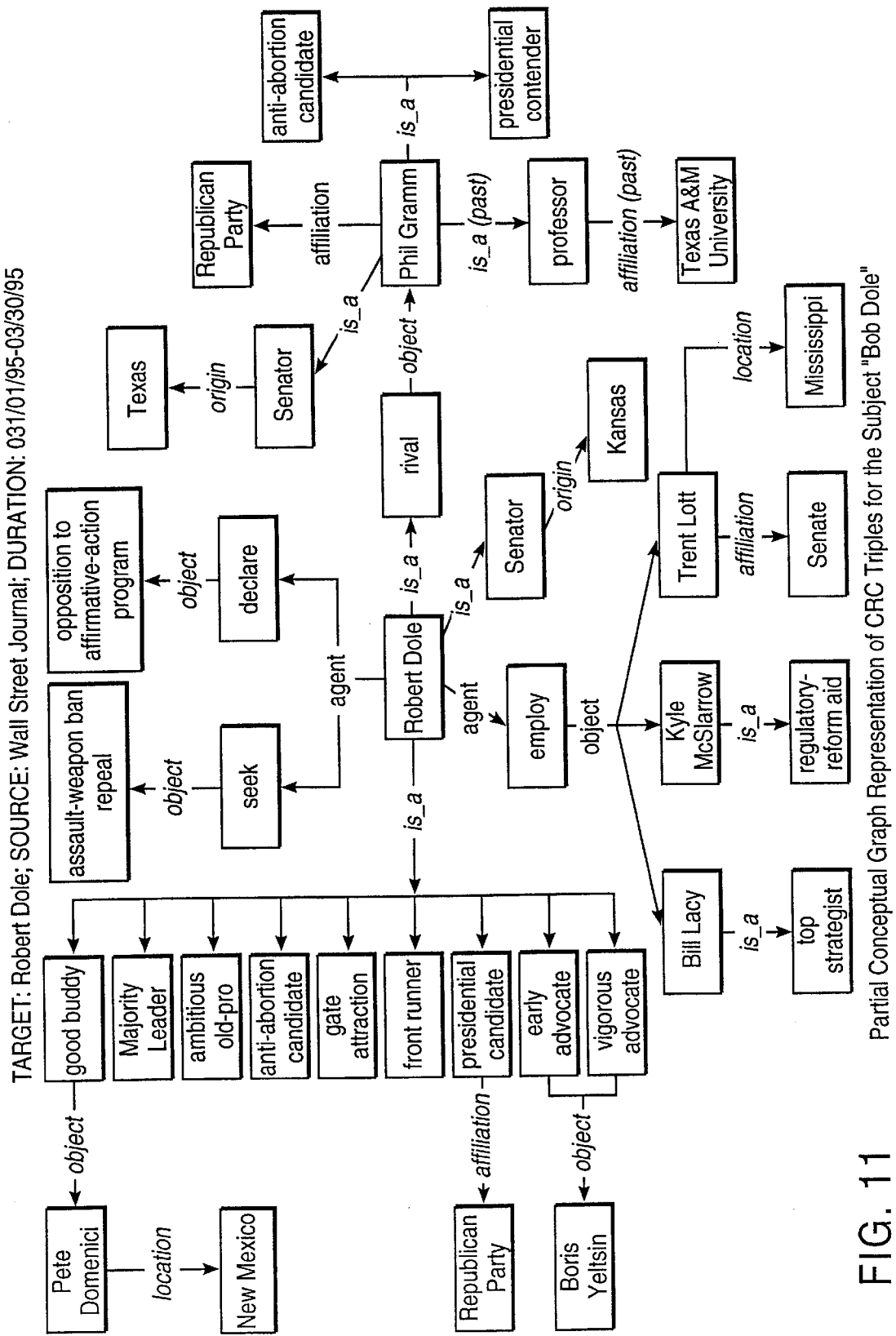
FIG. 11   Partial Conceptual Graph Representation of CRC Triples for the Subject "Bob Dole"

INFORMATION EXTRACTION SYSTEM AND METHOD USING CONCEPT-RELATION-CONCEPT (CRC) TRIPLES

CROSS-REFERENCE TO RELATED APPLICATIONS

This application is a continuation of and claims the benefit of U.S. patent application No. 08/795,658, filed Feb. 6, 1997, now U.S. Pat. No. 6,076,088, filed Nov. 11, 2000 which is a continuation-in-part of Provisional Application No. 60/015,512, filed Apr. 16, 1996 and U.S. Provisional Application No. 60/011,369, filed Feb. 9, 1996, the disclosures of which are incorporated by reference for all purposes.

This application claims priority from, and is a continuation-in-part of the following provisional applications, the disclosures of which are hereby incorporated by reference:

U.S. patent application Ser. No. 60/011,369, filed Feb. 9, 1996, entitled "CHRONOLOGICAL INFORMATION EXTRACTION SYSTEM (CIES)," to Woojin Paik; and U.S. patent application Ser. No. 60/015,512, filed Apr. 16, 1996, entitled "INFORMATION RETRIEVAL SYSTEM AND METHOD USING CONCEPT-RELATION-CONCEPT TRIPLES," to Woojin Paik and Elizabeth D. Liddy.

The following applications are also hereby incorporated by reference:

U.S. patent application Ser. No. 08/696,701, filed Aug. 14, 1996 now U.S. Pat. No. 6,006,221, entitled "MULTILINGUAL DOCUMENT RETRIEVAL SYSTEM AND METHOD USING SEMANTIC VECTOR MATCHING," to Elizabeth D. Liddy, Woojin Paik, Edmund S. Yu, and Ming Li;

U.S. patent application Ser. No. 08/698,472, filed Aug. 14, 1996, now U.S. Pat. No. 5,963,940, entitled "NATURAL LANGUAGE INFORMATION RETRIEVAL SYSTEM AND METHOD," to Elizabeth D. Liddy, Woojin Paik, Mary McKenna, and Ming Li; and U.S. patent application Ser. No. 08/696,702, filed Aug. 14, 1996, now U.S. Pat. No. 6,026,388 entitled "USER INTERFACE AND OTHER ENHANCEMENTS FOR NATURAL LANGUAGE INFORMATION RETRIEVAL SYSTEM AND METHOD," to Elizabeth D. Liddy, Woojin Paik, Mary McKenna, Michael Weiner, Edmund S. Yu, Ted Diamond, Bhaskaran Balakrishan, and David Snyder.

GOVERNMENT RIGHTS

The U.S. Government has rights in this invention pursuant to Contracts No. F30602-96-C-0164 and F3-602-95-C-0187 awarded by the U.S. Air Force Rome Laboratory.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of computer-based information retrieval, and more specifically to the application of natural language processing (NLP) techniques to the interpretation and representation of computer text files, and to the matching of natural language queries to documents.

As the amount of electronic information continues to increase, the demand for sophisticated information access systems also grows. Over the years, new types of information access systems such as data mining systems have become commercially available; however, until the present invention, domain-independent question-answering systems still exist only as experimental prototypes.

Both types of systems require a pre-constructed repository of information to find answers to users' questions. Data mining systems commonly utilize statistical procedures to detect patterns in data; users are expected to interpret the patterns to find the answers. The current interests and successful commercial uses of data mining systems are due to the premise that these systems are designed to use the same set of data which is already used by the legacy database management systems.

In comparison, question-answering systems are designed to provide answers directly to users as if they were involved in question-answering sessions with other people. This requires systems to perform complex inferencing to draw answers from organized knowledge bases. Over the years, there has been significant progress in the problem-solving aspect of AI research; however, there are no practical AI applications except the ones which are used in a few narrowly-defined domains. This is due to the lack of practical knowledge bases. Research has demonstrated that building the requisite knowledge bases automatically is extremely time consuming and expensive.

For a number of years, both manual and automatic approaches to constructing knowledge bases have been studied and implemented; however, manual construction of knowledge bases has been too expensive to be practical, as was discovered in the CYC Project (Lenat et al., 1989), and automatic approaches have not yet produced domain-independent and usable knowledge bases. The CYC project was an attempt to build a common-sense knowledge base, containing all the information necessary for a person to understand a one volume desk encyclopedia and a newspaper. The project began in 1984, with specially trained knowledge editors manually entering knowledge in the CYC database. The knowledge base is still incomplete. In recent years, there has been increased interest in textual information extraction research using natural language processing techniques. The most common medium of storing knowledge is texts. Textual information extraction extracts and organizes knowledge from texts automatically.

Research efforts in this field have been reported in the Message Understanding Conferences (MUC). The goal of MUCs was to automatically extract information from news texts to populate structured databases. Participants of MUC were given the task of extracting information about clearly defined event types (or domains) such as "terrorism in South America." For each event type, the MUC participants were given pre-determined categories of information that their systems were required to extract. The goal of MUC is to evaluate information extraction systems applied to a common task. MUCs have been funded by the Advanced Research Project Agency (ARPA) to measure and foster progress in information extraction. The focus of MUCs has been a single task of information extraction by analyzing free text, identifying events of a specified type, and filling a database template with information about each event (MUC-6).

In the MUC tradition, there are two fundamental modes of information extraction: atomic and molecular. The atomic approach relies on the strong typing of entities to match them to roles in events; the molecular approach relies much more on the placement of the entity description within syntactic patterns.

For example, a terrorist organization, "Shining Path" is identified as the perpetrator in a message which has been categorized as a terrorist story within the "atomic" framework of information extraction. This is possible as all appropriate elements of an event and each element's type are pre-determined. Specifically, a terrorist organization type entity is considered to take the role of the perpetrator of a terrorist activity in a terrorist story.

In comparison, in the "molecular" approach to extracting information, if a name of an organization occupies the subject position of a verb which describes the terrorist activity such as "bomb" or "kill," the organization is identified as the perpetrator.

The limitation to both these approaches is that they are domain-dependent. To change domains requires a lengthy process of preparing a new knowledge base for another subject which would list various entities and events exhaustively. Both approaches depend on the careful analysis of common terminologies which are used in each event type. Thus, every participating system has to be re-worked either to capture the typical roles of the exhaustive list of entities (for example, names of all terrorist groups in South America or the names of bombs) which have potential to occur in the designated event or to identify all possible verbs which can be used to describe the event and the associated roles of the syntactic arguments of the verbs. These processes can take long periods of time, varying from a few weeks to several months.

While many participating systems in MUC have been successful in extracting relevant information, given that there are an almost infinite number of event types or subject domains, it does not seem feasible to build a domain-independent textual information extraction system by following MUC's one-domain-at-a-time approach.

SUMMARY OF THE INVENTION

The present invention provides an information extraction system that allows users to ask questions about documents in a database, and responds to queries by returning possibly relevant information which is extracted from the documents.

The system is domain-independent, and automatically builds its own subject knowledge base. It can be applied to any new corpus of text with quick results, and no requirement for lengthy manual input. For this reason, it is also a dynamic system which can acquire new knowledge and add it to the knowledge base immediately by automatically identifying new names, events, or concepts.

In short, a set of documents is subjected to operations which extract concept-relation-concept triples (CRCs), which are stored in a data organization (such as a database) for query purposes. In the specific embodiment, the first concept is a proper name. The CRCs may be converted to a knowledge representation (KR) prior to indexing and storage. Query text is subjected to similar processing. In a specific embodiment, new names, events, or concepts are also provided with time-stamped information so that an instant chronology is constructed or updated.

The system extracts information from text about any concept and its relations to any other concepts within that text. Using information-rich linguistic constructions in close proximity to a named entity or concept, it extracts information from a database and organizes that information. If desired, the information can be organized chronologically, independent of the artificial divisions of separate documents, to create a merged chronological profile. The system recognizes proper names, named entities or concepts automatically, and it identifies the sources of its information so that separate facts can be traced to their origins. Furthermore, it records and reports relations of any concept in a database with other concepts (e.g., people, events, places, organizations).

The system answers "Who-What-Where-When-Why-How" questions (sometimes referred to as W-H questions). It can therefore be used productively to monitor current news, or in scenario analysis, situation assessment, trend analysis, competitive intelligence, biographical or historical research. Its use of linguistic clues also allows it to retrieve images, charts, and tables from mixed media databases which incorporate illustrations into textual materials.

The system is modular, so that it can be adapted to various subject domains, knowledge representation schemes, or text types. While this specific embodiment describes its use with news sources, medical literature, military instructional manuals, or the World Wide Web are possible applications.

A further understanding of the nature and advantages of the present invention may be realized by reference to the remaining portions of the specification and the drawings.

BRIEF DESCRIPTION OF THE DRAWINGS

FIG. 11 is a representation of the browser screen.

BRIEF DESCRIPTION OF TABLES

Figure 1:
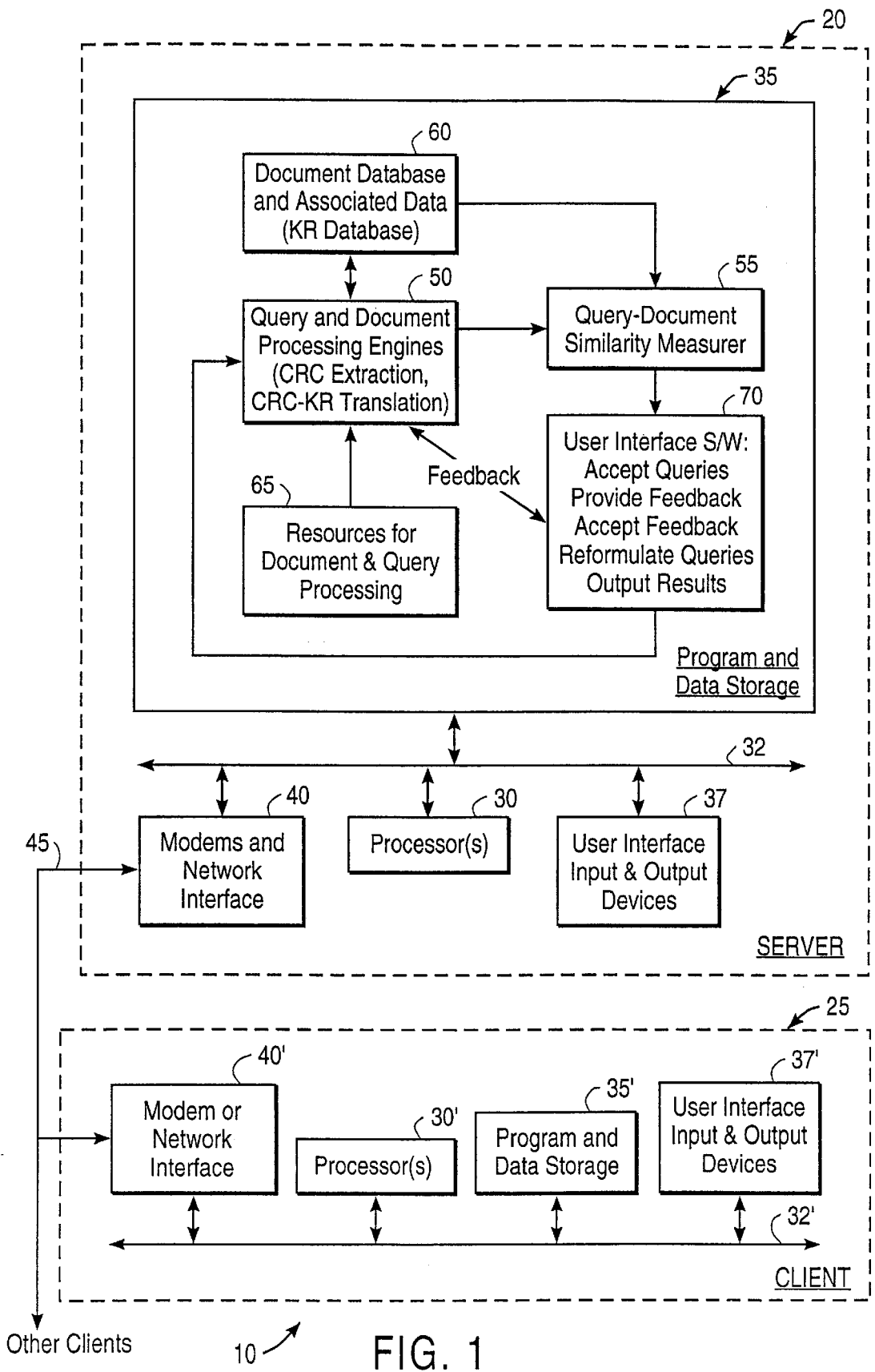
FIG. 1 is a block diagram of an information retrieval system embodying the present invention.

Table 1 sets forth a set of proper name categories;

Table 2 sets forth a set of relations; and

Table 3 sets forth a conceptual graph language definition.

DESCRIPTION OF SPECIFIC EMBODIMENTS

1.0 Introduction

This application describes a computer system used for information retrieval that, through a sequence of computer and user interactions, allows the expression and clarification of complex query statements and the retrieval and display of relevant information from documents using natural language processing (NLP) techniques.

In this specific embodiment, the system extracts from news articles and news feeds information about all named entities and their relations to any named entity or concept: events, organizations, people, or other concepts. The information is merged into a single profile, with reference to original sources, and it is organized chronologically to create an instant biography This information can be retrieved by the user either in response to W-H questions, or it can be used by browsing through a hyperlinked, dynamic graphical summary of all the information on any named entity in the database.

Since the system according to this specific embodiment organizes information chronologically, the system will sometimes be referred to as CHESS (chronological information extraction system) in this application. While this specific embodiment describes extraction of time-stamped information from a database containing news articles for several years, the technology is in no way limited to or dependent on time-related information.

Current information retrieval systems are document-based. In answer to a query, they return documents which may contain the information requested by the user. The above referenced patent application Ser. Nos. 08/698,472, filed Aug. 14, 1996, entitled "NATURAL LANGUAGE INFORMATION RETRIEVAL SYSTEM AND METHOD," and Ser. No. 08/696,702, filed Aug. 14, 1996, entitled "USER INTERFACE AND OTHER ENHANCEMENTS FOR NATURAL LANGUAGE INFORMATION RETRIEVAL SYSTEM AND METHOD" describe aspects of an intelligent text retrieval system named DR-LINK (Document Retrieval using Linguistic Knowledge), which takes a step beyond standard information retrieval systems in that it seeks to identify the meaning of words, rather than simply matching strings of letters. DR-LINK still returns documents as answers, which is entirely appropriate for certain applications. For the user, perusing lists of documents in search of a specific fact can be time consuming, however.

In contrast, CHESS, which is an information extraction system, goes beyond document boundaries to extract and summarize the contents of an entire collection of documents. It aggregates information across document boundaries. In CHESS, answers to queries are concise, returning a summary of all information in the database which answers a query, no matter what its source is, while still enabling the user to consult the original source, if necessary. CHESS technology takes advantage of some of the techniques for document processing and information analysis which were developed for DR-LINK.

The disclosure of all articles and references, including patent documents, mentioned in this application are incorporated herein by reference as if set out in full.

1.1 Terms Used

Unless otherwise stated, the following meanings should be attached to the following terms:

Document: A unit of text which is selected for analysis, and to include an entire document, or any portion thereof, such as a title, an abstract, or one or more clauses, sentences, or paragraphs. A document will typically be a member of a document database, referred to as a corpus, containing a large number of documents. Such a corpus can contain documents in any or all of the plurality of supported languages.

Corpus: A body of text consisting of a number of documents.

Query: text that is input for the purpose of selecting a subset of documents from a document database. While most queries entered by a user tend to be short compared to most documents stored in the database, this should not be assumed. The present invention is designed to allow natural language queries.

Word: Includes single words, compound words, phrases, and other multi-word constructs. Furthermore, the terms "word" and "term" are often used interchangeably. Terms and words include, for example, nouns, proper nouns, complex nominals, noun phrases, verbs, adverbs, numeric expressions, and adjectives. This includes stemmed and non-stemmed forms.

Concept: Any named entity or idea, such as a person, place, thing, or organization.

Relations: Relations define the nature of the interaction, dependency, influence, or simple co-occurrence that binds to concepts. These relations allow the creation of concept-relation-concept triples by categorizing named entities and pieces of information in linguistic constructions at the more abstract conceptual level. Dyadic relations link pairs of concepts while monadic relations are associated with a single concept. Unless otherwise distinguished, the term "relation" will normally be taken to mean a semantic relation.

CRC triple: The CRC triple, or simply CRC, is the basic unit/subgraph of information in CHESS. It consists of two concepts linked by a dyadic relation. For instance, the sentence, "Georgia O'Keefe is a painter" can be distilled into a CRC in which O'Keefe is the first, or subject concept, linked to painter, the second, or descriptive concept, by the relation "ISA."

RC pair: This refers to the association of a monadic relation and a concept.

Knowledge Representation (KR) scheme: a precise and unambiguous formalism for representing information.

Semantic Network: a knowledge representation in which "knowledge is represented by a labelled, directed graph whose nodes represent concepts and/or objects and whose arcs represent relationships between these objects and concepts" (from Encyclopedia of Artificial Intelligence (ed. by Stuart C. Shapiro, John Wiley & Sons: New York, 1990, p. 885)).

Granularity: The degree of specificity to which information is indexed.

KR Unit: The smallest unit which is used to match a query with the KR database. It can consist of one or more CRCs.

Case frame, case grammar: In case grammar, the verb is regarded as the most important part of the sentence, and has a number of semantic relations with various noun phrases. These relations are called cases. Examples of cases are instrumental (the object used to perform an action), agentive (performer of an action), or dative (receiver of the action). For example "X attacked Y with a knife"

1.2 System Hardware Overview

FIG. 1 is a simplified block diagram of a computer system 10 embodying the text retrieval system of the present invention. The invention is typically implemented in a client-server configuration including a server 20 and numerous clients, one of which is shown at 25. The use of the term "server" is used in the context of the invention, where the server receives queries from (typically remote) clients, does substantially all the processing necessary to formulate responses to the queries, and provides these responses to the clients. However, server 20 may itself act in the capacity of a client when it accesses remote databases located on a database server. Furthermore, while a client-server configuration is known, the invention may be implemented as a standalone facility, in which case client 25 would be absent from the figure.

The hardware configurations are in general standard, and will be described only briefly. In accordance with known practice, server 20 includes one or more processors 30 that communicate with a number of peripheral devices via a bus subsystem 32. These peripheral devices typically include a storage subsystem 35 (memory subsystem and file storage subsystem), a set of user interface input and output devices 37, and an interface to outside networks, including the public switched telephone network. This interface is shown schematically as a "Modems and Network Interface" block 40, and is coupled to corresponding interface devices in client computers via a network connection 45.

Client 25 has the same general configuration, although typically with less storage and processing capability. Thus, while the client computer could be a terminal or a low-end personal computer, the server computer would generally need to be a high-end workstation or mainframe. Corresponding elements and subsystems in the client computer are shown with corresponding, but primed, reference numerals.

The user interface input devices typically include a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, are also possible.

The user interface output devices typically include a printer and a display subsystem, which includes a display controller and a display device coupled to the controller. The display device may be a cathode ray tube (CRT), a flat-panel device such as a liquid crystal display (LCD), or a projection device. Display controller provides control signals to the display device and normally includes a display memory for storing the pixels that appear on the display device. The display subsystem may also provide non-visual display such as audio output.

The memory subsystem typically includes a number of memories including a main random access memory (RAM) for storage of instructions and data during program execution and a read only memory (ROM) in which fixed instructions are stored. In the case of Macintosh-compatible personal computers the ROM would include portions of the operating system; in the case of IBM-compatible personal computers, this would include the BIOS (basic input/output system).

The file storage subsystem provides persistent (non-volatile) storage for program and data files, and typically includes at least one hard disk drive and at least one floppy disk drive (with associated removable media). There may also be other devices such as a CD-ROM drive and optical drives (all with their associate removable media). Additionally, the system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site on the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of PCs and workstations.

Bus subsystem 32 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

The user interacts with the system using user interface devices 37' (or devices 37 in a standalone system). For example, client queries or browsing requests are entered via a keyboard, communicated to client processor 30', and thence to modem or network interface 40' over bus subsystem 32'. The query or browsing request is then communicated to server 20 via network connection 45. Similarly, results of the query or browsing request are communicated from the server to the client via network connection 45 for output on one of devices 37' (say a display or a printer), or may be stored on storage subsystem 35'.

1.3 Text Processing (Software) Overview

Researchers have identified two broad categories of information seeking behavior. Each fills a different information need. The first is querying, which seeks a very specific set of information in answer to a specific question. Users must generally devise a "query" using either specialized terms or commands. For instance, "What is the drug of choice for treating tuberculosis?" is a typical query. Answers to a query are generally either retrieved facts which answer that question directly, or documents which contain the answers to that question.

Browsing, in contrast, allows a user to explore a broad topic with only a vaguely defined need. Browsing online is akin to wandering in a library's stacks to see what there is on a topic. For instance, one might choose "medicine" as a topic to browse. In answer to this browsing behavior, a response would generally be a list or display of related topics which would then allow a user to wander at a deeper level within the broad topic. In the case of medicine, perhaps the system would display choices such as "History of Medicine," "Common Diseases," "Famous Physicians," and "Pharmaceutical Aspects." The user might then choose to browse through Pharmaceuticals, and be given a list of drugs to look at.

CHESS provides both a query and a browsing interface to the system. The query interface allows users to enter "W-H questions" or propositions. The browsing interface permits exploration of the contents of the system through a dynamic graphical hyperlinked display of the requested broad term, plus all the related areas which are linked to it.

The server's storage subsystem 35, as shown in FIG. 1, maintains the basic programming and data constructs that provide the functionality of the CHESS system. CHESS provides rich, deep processing of text by representing and matching documents and queries at the lexical, syntactic, semantic, and discourse levels, not simply by detecting the co-occurrence of words or phrases. Users of the system are able to enter queries as fully-formed sentences, with no requirement for special coding, annotation, or the use of logical operators.

The system is modular and performs staged processing of documents, with each module adding a meaningful annotation to the text. For query matching, a query undergoes analogous processing to determine the requirements for document matching. The system generates a representation of each document and query in terms of concept-relation-concept (CRC) triples, which, in a specific embodiment, are translated to a knowledge representation (KR) for subsequent use.

The processing modules include a set of processing engines, shown collectively in a processing engine block 50, and a query-document Similarity Measurer 55. It should be understood, however, that by the time a user is entering queries or browsing requests into the system, the relevant document databases will have been processed and annotated, and various data files and data constructs will have been established. These are shown schematically as a "Document Database and Associated Data" block 60, referred to collectively below as the document database. An additional set of resources 65, possibly including some derived from the corpus at large, is used by the processing engines in connection with processing the documents and queries. Alternatively, documents can be processed and annotated on the fly as they arrive in real time.

User interface software 70 allows the user to interact with the system. The user interface software is responsible for accepting queries and browsing requests, which it provides to processing engine 50. The user interface software also provides feedback to the user regarding the system's interpretation of the query, and accepts responsive feedback from the user in order to reformulate the query or provide other input to the processing engines. The user interface software also presents the retrieved documents as a result of the query to the user and reformats the go output in response to user input. User interface software 70 is preferably implemented as a graphical user interface (GUI), and will often be referred to as the GUI.

Figure 2:
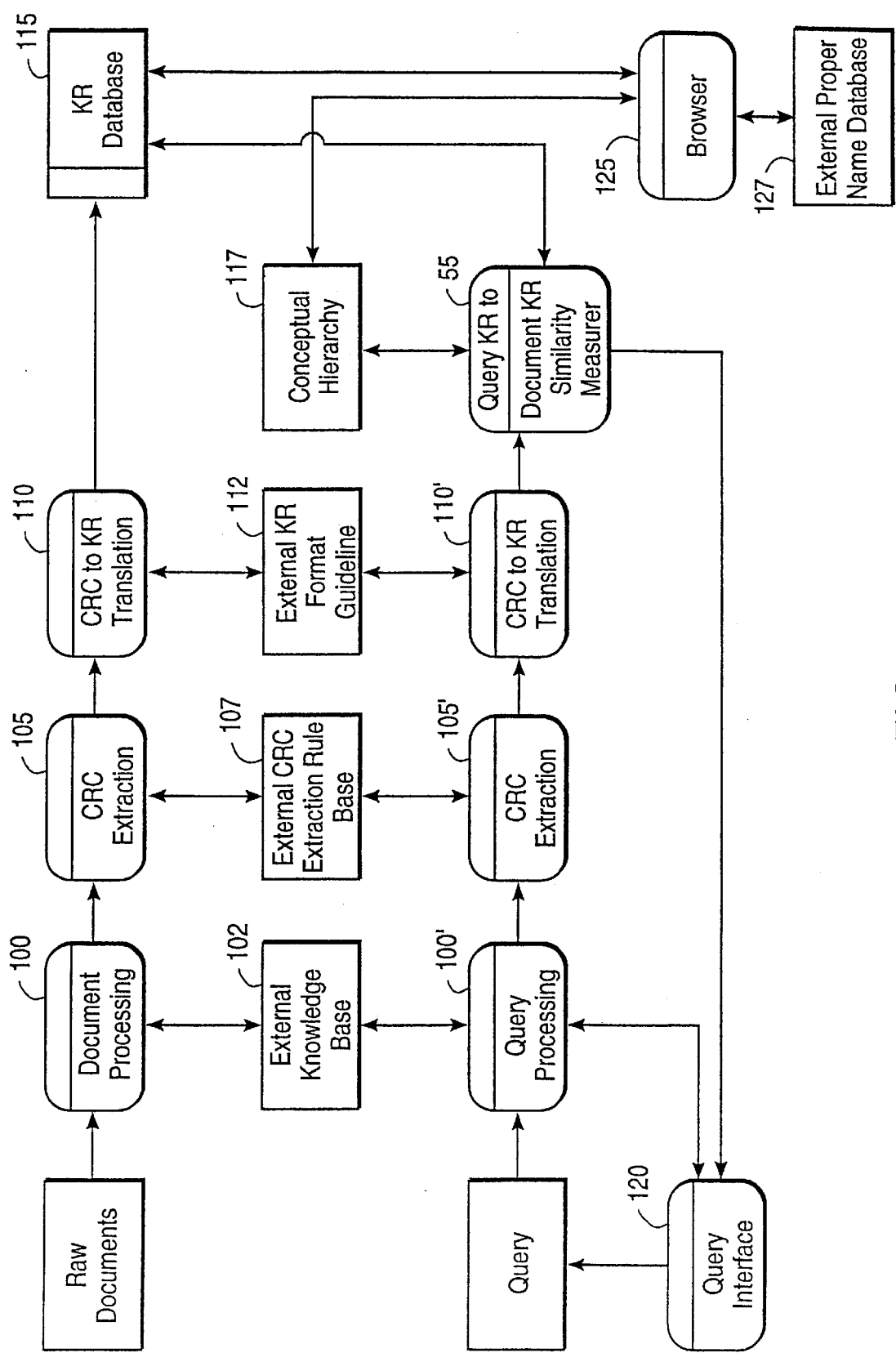
FIG. 2 is a block diagram showing the overall operation of the system.

FIG. 2 is a block diagram showing the overall operation of the system as documents and queries are processed and documents are matched to queries. The figure shows separate paths for documents and queries, with separate processing modules in the two paths. In most cases, the same modules or slightly altered modules are used to process documents and queries. As mentioned above, the documents are typically processed before any queries are accepted or processed. In any event, the document modules and the query processing modules share common resources (databases, etc.). In the detailed description of the modules in following sections, similarities and differences will be noted. In the specific embodiment described in this patent application, the source of raw text is news articles from news feeds.

Raw text documents are loaded into a Document Processing module 100, which has an associated External Knowledge base 102. At this stage the documents are parsed structurally to identify sentence and paragraph boundaries, optionally parsed by a syntactic parser, tagged for parts of speech, and analyzed for numeric concepts and linguistic structures. Additionally, proper names and other named entities are identified, and disambiguated.

The processed documents are then processed by a Concept-Relation-Concept (CRC) Extractor 105, which has an associated External CRC Extraction Rule base 107 and extracts CRC triples. The documents are then formatted by a CRC to Knowledge Representation (KR) Translator 110, which has an associated External KR Format Guideline base 112, and indexed and stored in a KR Database 115 as KR units. Knowledge bases 102, 107, and 112 are high-level representations, and a more detailed breakdown will be given in the additional description of the processing modules.

Queries are entered in a Query Interface 120, which is used to retrieve facts or to answer specific questions, and are processed similarly, passing from the Query Interface to a Query Processing module 100', a CRC extractor 105' and a CRC-to-KR Translator 110'. Query processing differs from document processing in that query processing is an interactive process for concept and name clarification, which includes the user as an additional source of expert information. In both cases, the CRC Extractor is the same.

Similarity Measurer 55, with an associated Conceptual Hierarchy base 117, matches each query KR unit with the KR units contained in KR Database 115.

A Browsing User Interface (Browser) 125 provides an additional entry point for using CHESS. It is used to query the KR database graphically in order to retrieve all the information about a named entity. This is useful for vaguely conceived questions which can't be phrased specifically enough for a query. The browser makes use of Conceptual a Hierarchy base 117 and a Proper Name database 127 to clarify which of several similar names in the system the user wants to find.

It should be noted that it is not necessary to translate the CRCs prior to incorporating them into their ultimate data organization. In an earlier embodiment of CHESS, the CRCs were merged to form the structure of a semantic network, which defined the data organization against which queries were run.

2.0 Document Processing

2.1 Document Processor Module Overview

Figure 3:
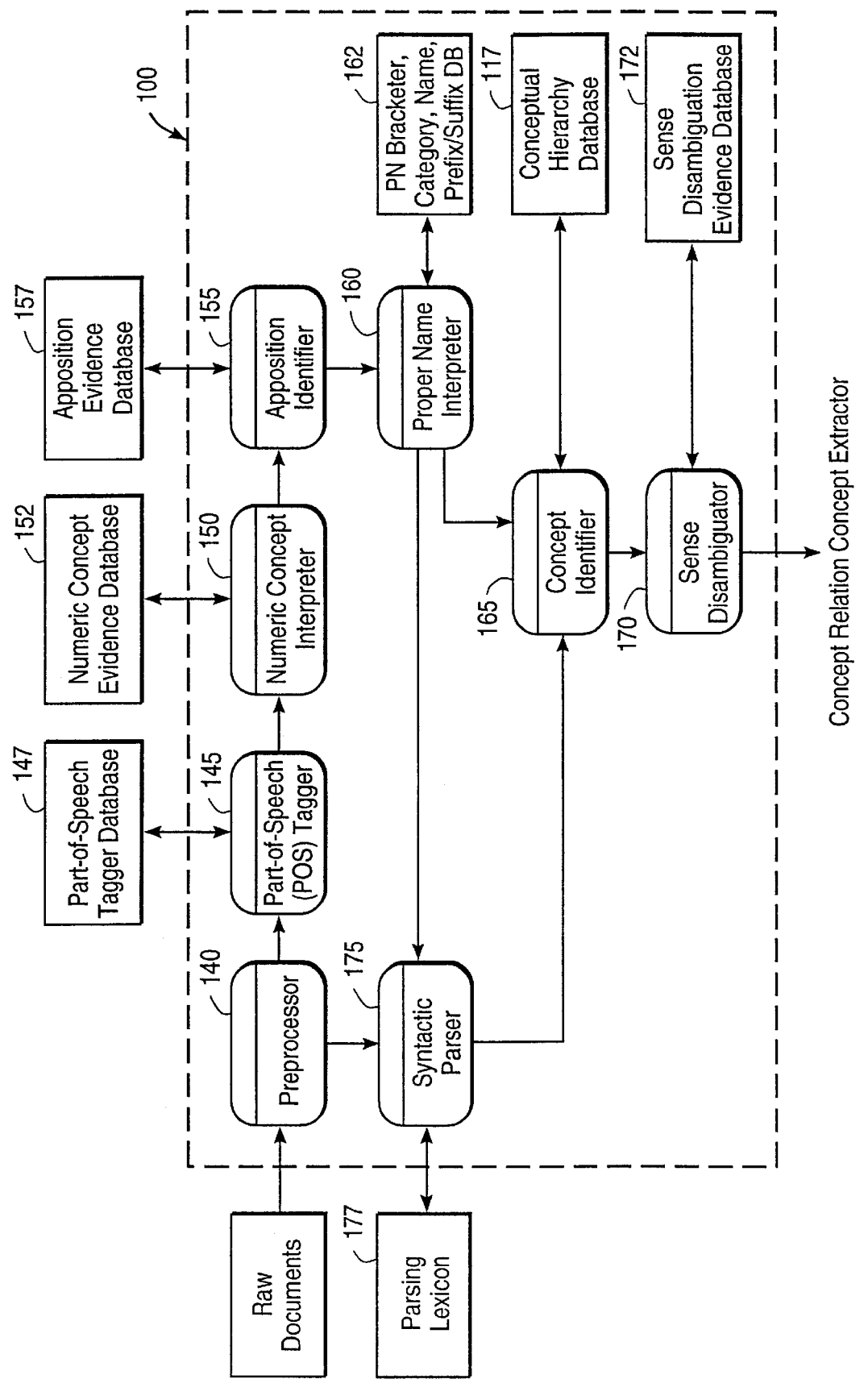
FIG. 3 is a block diagram showing document processing performed by the system prior to CRC extraction.

FIG. 3 is a block diagram showing document processing performed by the system prior to CRC extraction. The modules within the dashed rectangle define Document Processing module 100, and the databases outside the dashed rectangle collectively define External Knowledge base 102. The modules include:

- a Preprocessor 140;
- a Part-of-Speech (POS) Tagger 145 with associated POS, End-Of-Sentence Detection, and Lexical Cue databases 147;
- a Numeric Concept Interpreter 150 with an associated Numeric Concept Evidence databases 152;
- an Apposition Identifier 155 with an associated Apposition Evidence database 157;
- a Proper Name (PN) Interpreter 160 with associated set of PN databases 162;
- a Concept Identifier 165, which makes use of Conceptual Hierarchy database 117;
- a Sense Disambiguator 170 with an associated Sense Disambiguation Evidence database 172; and
- an optional Syntactic Parser 175 with an associated Parsing Lexicon 177.

2.2 Document Preprocessor

Document preprocessor 140 transforms raw digital data files of text into a uniform format suitable for further processing by the system. Preprocessing involves some discourse-level manipulation of text, such as the explicit decomposition of composite documents into appropriate sub-texts. All text is annotated with pseudo-SGML tags (Bryan, 1988). Preprocessing tags include, but are not limited to, fields such as <caption>, <date>, <headline>, <sub-text headline>, and <sub-text>, <Fig.> and <table>. The preprocessor further identifies various fields, clauses, and punctuation in a text, and annotates a document with identifying tags for these units. The identification process occurs at the sentence, paragraph, and discourse levels and is a fundamental precursor to later natural language processing and document-query matching.

2.3 Part-of-Speech (POS) Tagger

In a current implementation, documents are first processed using a custom End-of-Sentence detection program, followed by a commercial off-the-shelf (COTS) probabilistic part-of-speech (POS) tagger of the type provided by such companies as Inso Corporation, Boston, Mass. POS tagger 145 identifies over 47 grammatical forms and punctuation marks. In addition, hyphenated words are often given multiple tags-each constituent word is given a tag, and the whole hyphenated phrase is given a tag. The preferred implementation performs additional processing of text, numerals, and other markings and attributes beyond that of the commercial POS tagger.

2.4 Numeric Concept Interpreter

Numeric Concept Interpreter 150 identifies the boundaries of a numeric concept, even when it spans several terms, then classifies that concept as one of the many numeric concept types. These include, but are not limited to: monetary amount, date, duration, length, weight, capacity, size, temperature, ratio, other. The concepts are normalized to a common format which can be used for comparison during query matching between two numeric concepts which belong to the same type. The Numeric Concept Evidence Database 152 contains specific linguistic patterns which indicate the categories of numeric concepts such as names of months, various forms of numbers, such as those which indicate a year (e.g., 1973), etc.

2.5 Apposition Identifier

In this specific embodiment, Apposition Identifier 155 represents one type of linguistic construction, the appositional phrase, which can be identified automatically. Appositions typically are a rich source of information concerning proximal named entities. For instance, "Dr. James, a board-certified neurosurgeon . . . " contains the appositional phrase "board-certified surgeon" which describes Dr. James. Other linguistic constructions which contain this kind of information are also identified in similar modules, depending on the corpus in question For instance, the copula sentence, "John is a fisherman" also yields descriptive information which CHESS can extract about the subject. Apposition Evidence Database 157 contains specific linguistic patterns which signal the beginning and end of appositional phrases.

2.6 Proper Name Interpreter

Proper names, group proper names (e.g., the Far East), and group common nouns (e.g., anti-cancer drugs) are recognized as important sources of information for detecting relevant documents in information retrieval (Liddy et al, 1994). Proper Name Interpreter 160 first locates the boundaries of proper noun phrases using the POS tags mentioned earlier. Heuristics developed through corpus analysis are applied to bracket proper name phrases which contain embedded conjunctions and prepositions (e.g., Department of Defense, Centers for Disease Control and Prevention).

The current CHESS proper name classification scheme uses 53 concept categories including a miscellaneous category. Classification occurs in the following sequence:

Proper name suffixes, prefixes and infixes (e.g., Hospital, Senator, Professor) are examined for possible categorization using Proper Name Prefix/Suffix Database 162.

The proper name is passed to a database 162 to determine if an alternative, standard form exists (e.g., President Bill Clinton for Bill Clinton). If the proper name is an alias, the standard form is used for categorization.

Proper names are compared to a database of significant personal names for a possible match using Name Database 162.

The proper name is next run through context heuristic tests. For example, if the proper name is immediately followed by a comma and a state, county, or country name, then the proper name is identified as a town, city, or other geographic entity. Appositional phrases (noun phrases found in close proximity to proper names, usually revealing identifying information about the proper named entity) will also be detected and used in the categorization process. Numerous other heuristics are applied until the proper name has been tested for inclusion in one of the 53 categories.

Those proper names that remain uncategorized are assigned to the "miscellaneous" category: in tests fewer than 11% of proper names are assigned "miscellaneous." Proper Name categories used in CHESS are set forth in Table 1 in a later section:

2.7 Syntactic Parser

The use of Syntactic Parser 175 to document processing is optional. Such a parser increases the variety of linguistic constructions which can be used to extract information from text, and in particular, non-redundant text. Its use is optional, depending on the requirements of the corpus to be parsed. The Syntactic Parser can either be used to improve the processing output from text which has been processed through the modules above, or it can process text directly from Preprocessor 140 which has only added sentence, field and paragraph boundaries. Choice of processing path depends on speed constraints. The parser is a commercial off-the-shelf product such as the LINK GRAMMAR PARSER (Sleator and Temperley, 1993) from Carnegie Mellon University or the XLE PARSER from Xerox PARC. The accompanying Parsing Lexicon 177 acts as a knowledge base containing syntactic information about words and phrases.

2.8 Concept Identifier

Concept Identifier 165 scans text from left to right to determine the boundaries between unique concepts. It searches for the longest phrase possible. Phrases are defined as one or more non-predicating adjectives or nouns preceding a noun. Each identified phrase becomes a candidate for a concept. Phrasal verbs are defined as one or more adverbs or prepositions following a verb. Each phrasal verb becomes a candidate for a concept. Proper names, which are identified in Proper Name Interpreter 160, and Numeric Concepts, which are identified in Numeric Concept Interpreter 150, are also considered as concepts. All open class words (e.g., nouns, verbs, adjectives, adverbs) which are not a part of the above identified candidate concepts or concepts are also considered as concepts.

Each original and morphologically standardized (e.g., the plural form of a noun converted to the singular form and the past tense form of a verb converted to the present tense form) phrase candidate and phrasal verb candidate is checked against Conceptual Hierarchy database 117 until the match is found. If no match is found then the phrase or phrasal verb is not considered as a concept. The component words, which are open class words, of the phrase or the phrasal verbs are considered as concepts.

The following example illustrates how CHESS identifies concepts in the sample sentence:

"David Smith put off paying his 250 dollar telephone bill until it was overdue."

CHESS identifies "David Smith" as a personal proper name, "put off" as a phrasal verb (a combination of a verb plus a preposition or an adverb), "250 dollar" as a monetary numeric concept, and "telephone bill" as complex nominal. "Paying" and "overdue" are each identified as single word concepts. "Put off" was identified by consulting the Conceptual Hierarchy database to determine its idiomatic meaning.

Conceptual Hierarchy database 117 maps related words and terms (synonyms) into a single concept cluster. The database differentiates between phrases as concept units and single term concepts. The concepts are organized as a hierarchical set of relations in the database. The Conceptual Hierarchy database is constructed from raw text sources, and augmented by such existing products such as WORDNET (Miller, 1995) or other thesauri.

2.9 Sense Disambiguator

Sense Disambiguator 170 assigns a unique sense, which takes the form of a concept, to each content bearing word in the text. The algorithm develops a decision list for each content bearing word. This list associates certain patterns of words with a particular meaning. An example would be the word "plant" which can mean either a green plant or a manufacturing plant. This ambiguity is common in English, and people use context to disambiguate meanings. Similarly, Sense Disambiguation Evidence database 172 is used to supply the contextual cues necessary for CHESS to disambiguate meanings. The Sense Disambiguator can determine which meaning is used for a word by examining the context in which it occurs, and in particular which words co-occur. In this specific embodiment, sense is disambiguated using unsupervised sense disambiguation with iterative bootstrapping. However, CHESS can incorporate other approaches instead, such as the DR-LINK Subject Field Codes (SFC) disambiguation system which can be described as unsupervised sense disambiguation using thesaurus class models.

Output from the Document Processing Module is passed to the CRC Extractor 105.

3.0 Concept-Relation-Concept (CRC) Extractor 3.1 Relations

Table 2, located in a later section, sets forth the relations used in a current implementation of CHESS. Relations define how concepts are connected to each other. They define what role a concept plays in a proposition or sentence. For example, a relation might be causal ("the earthquake caused the building to collapse."). In this case, one concept, earthquake, is in a causal relation with collapse.

Most of the relations are dyadic relations. That is they connect two concepts to form a CRC triple. A relatively small number of the relations (NECS, NEG, PAST, POSS, and PSBL) are monadic relations. That is they are associated with a single concept to form a relation-concept (RC) pair.

3.2 CRC Extractor Module Overview

Figure 4A:
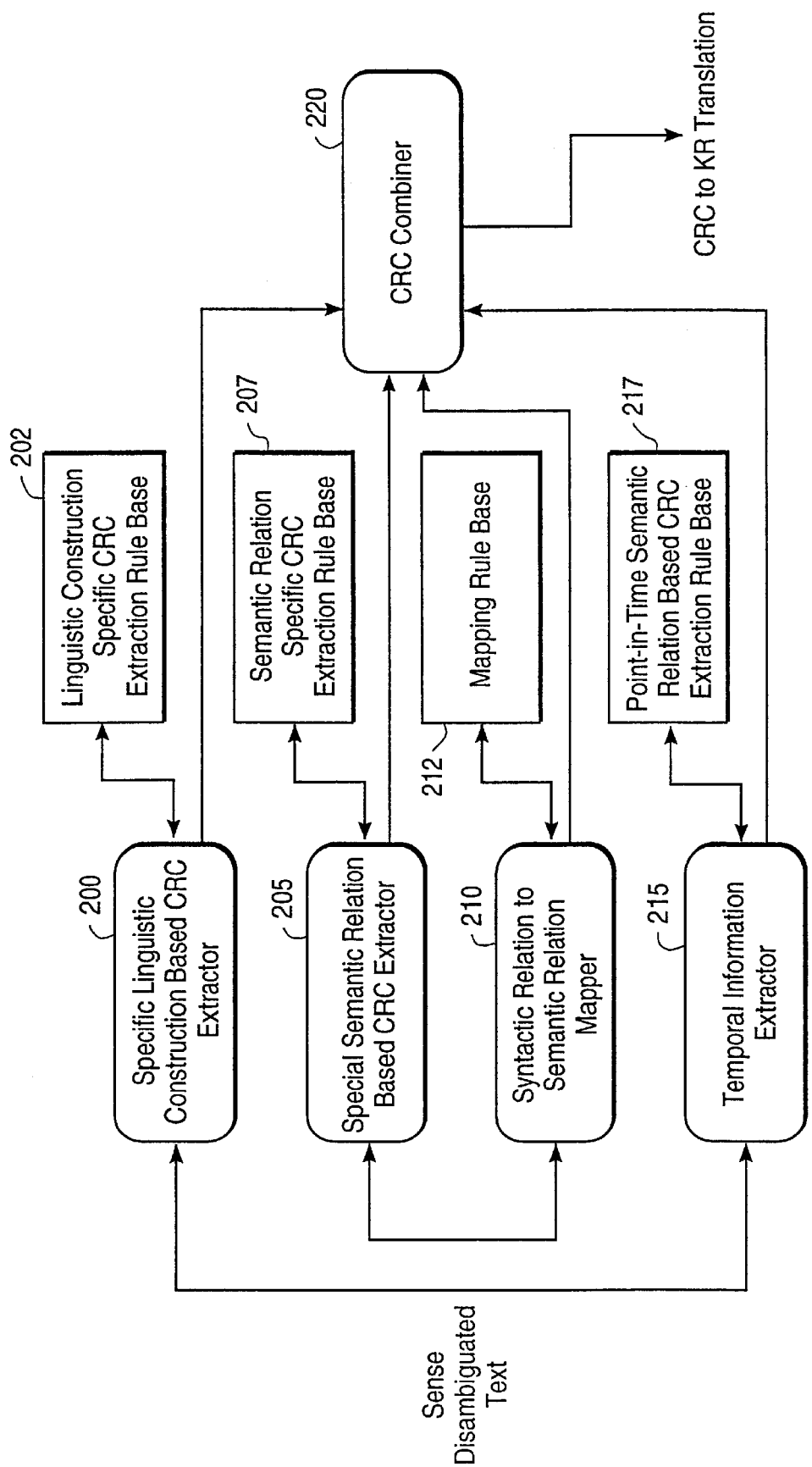
FIG. 4A is a block diagram showing the Concept-Relation-Concept (CRC) Extractor.

FIG. 4A is a block diagram showing CRC Extractor 105. CRC triples are the building blocks of the CHESS System. They consist of a subject concept, a descriptive concept which describes the subject concept, and a relation which describes the relation between the subject and descriptive concepts. For instance, the subject concept may be the cause of an action happening, or it may be the recipient of the effects of an action or event. These are different relations which distinguish how the same two concepts. For instance, the two sentences, "Fred raised taxes," and "Fred's taxes were raised" both deal with the same concepts, but the relations between them are entirely different. Fred is the agent of the action "raised" in the first sentence, while Fred is the recipient of the action "raising taxes" in the second sentence.

CRC triples are extracted from text as follows:

1. Identify boundaries between concepts and relation-revealing phrases using predetermined evidence sources such as punctuation marks, prepositional phrases, or other indicator words and linguistic structures.
2. Identify subject proper name and substitute full reference name, if necessary.
3. Identify descriptive information concepts.
4. Identify relations using rule-based detection and extraction module.

CRC Extractor 105 comprises four independent modules, which can process incoming text in any sequence. These are:

a Special Linguistic Construction based CRC Extractor 202 with an associated Linguistic Construction Specific CRC Extraction Rule Base 202;

a Special Semantic Relation-Based CRC Extractor 205 with an associated Semantic Relation Specific CRC Extraction Rule Base 207;

a Syntactic Relation to Semantic Relation Mapper 210 with an associated Mapping Rule Base 212; and a Temporal Information Extractor 215 with an associated Point-in-Time Semantic Relation based CRC Extraction Rule Base 217.

The outputs from these four modules are communicated to a CRC Combiner 220.

3.3 Special Linguistic Construction Based CRC Extractor

Special Linguistic Construction based CRC Extractor 200 identifies semantic relations between concepts using the co-referential proper name algorithm and the relation revealing formula. The process uses Linguistic Construction specific CRC Extraction Rule Base 202 as a knowledge base. This module was designed to process text which is redundant, i.e., text that contains multiple reports of the same event. For instance, in a collection of news articles, a specific event would be described in more than one source. Eventually, this event would be reported using an appositional phrase, relative clause, or copula sentence, so that the information could be extracted using this module.

3.3.1 Co-Referential Proper Names

This is a method for identifying relations between proper names and constituents in appositional phrases. The same approach is applicable to copula sentences whose subject is a proper name. If an apposition belongs to the apposition proper category, then there is at least one noun phrase in the apposition that refers to the same entity to which the proper name, which precedes or follows the apposition, refers. The "ISA" or "class" relation is assigned between the co-referential noun phrase in the apposition and the proper name. It is also possible to identify relations between the co-referential noun phrase and other constituents of the apposition. Since, the co-referential noun phrase and the proper name are referring to the same entity, it is possible to assign the same relation, which was identified with the co-referential noun phrase, between the proper name and other constituents in the apposition.

The following example, taken from a Wall Street Journal article (Page C5, Mar. 30, 1995), demonstrates the step-by-step parsing, tagging, and CRC creation process based on co-referential proper names:

FOOTHILL INDEPENDENT BANCORP (Glendora, Calif.)-Douglas F. Tessitor and Max E. Williams were named directors of this bank-holding concern, increasing the board to eight. Mr. Tessitor is an insurance agent at Northwestern Mutual Life Insurance Co. of Milwaukee. Mr. Williams is an architect and president of Williams Architects Inc., Calif.

The sentence "Mr. Tessitor . . . Milwaukee." has a copula form: in grammatical logic, a copula is a word or set of words (in this case, "is an") that act as connecting links between subject (the proper named Mr. Tessitor) and predicate. CHESS will parse and tag this sentence as follows:

</DOCID> . . .

[0:1] Mr. Tessitor |NP|3 is |VBZ an |DT <CN> insurance |NN agent |NN </CN> at |IN Northwestern_Mutual_Life_Insurance_Co.

|NP|5 of |IN Milwaukee |NP|6 .|.

| Key to Tagging | |
|---|---|
| <DOCID> | Document begins |
| |NP|x | Proper Noun (x is pointer to external reference to class information) |
| |VBx | Verb (x indicates class) |
| |DT | Determiner |
| <CN>. .</CN> | Complex nominal |
| |NN | Noun |
| |IN | Preposition |

In this example CHESS has successfully recognized and tagged the proper name "Mr. Tessitor," and related complex nominal and prepositional phrases.

In the next phase of processing, CHESS identifies boundaries (indicated by "*") between concepts and relation revealing phrases, as shown:

</DOCID> . . .

[0:1] Mr. Tessitor |NP|3* is |VBZ an |DT* <CN> insurance |NN agent |NN </CN>* at |IN

*Northwestern_Mutual_Life_Insurance_Co. |NP|5* of |IN*

Milwaukee |NP|6* ; |;*

Boundary points are located using a variety of evidence sources, including the placement and relation between punctuation markers, prepositions, complex nominals and appositional SGML markers.

From this, CHESS will be able to locate the elements that constitute CRC triples, as follows:

<TERM>

Mr. Tessitor |NP|3

</TERM>

<DESCRIPTOR> an |DT <CN> insurance |NN agent |NN </CN>

Northwestern_Mutual_Life_Insurance Co. |NP|5

Milwaukee |NP|6

</DESCRIPTOR>

The term (<TERM>) is the subject of the sentence; descriptors (<DESCRIPTOR>) are related noun constructs. In the next stage of processing, CHESS identifies the standard or clarified forms of the term and descriptors:

<CTERM>

30/Douglas_F._Tessitor |NP|

</CTERM>

<CDESCRIPTOR> an insurance agent

20/Northwestern_Mutual_Life_Insurance_CO

1/Milwaukee/6/Wisconsin/7/United_States

</CDESCRIPTOR>

Note how "Mr. Tessitor" has been taken to the standard form "Douglas F. Tessitor." In addition, various category ID numbers are applied. For example, "20" indicates a company, "30" indicates a person, and "1" indicates a city. Finally, Milwaukee is expanded to include state and country identification.

The final series of processes involve establishing the nature of the CRC relation: this is where the rule-based detection and extraction module will be used. Over 100 rules or patterns are currently used. We will investigate the application of a broader rule set including the general case of subject-verb-object sentences. Continuing with this example, the CRC extraction module for copula sentences recognizes the following structure:

<CRC>

A is a B at C of D

30/Douglas_F._Tessitor→(class)→insurance agent

30/Douglas_F. Tessitor→(affiliation)→

20/Northwestern_Mutual_Life_Insurance_CO

20/Northwestern Mutual_Life_Insurance_CO→(location)→

1/Milwaukee/6/Wisconsin/7/United_States

</CRC>

The words in parentheses (e.g., "class") are words that express the relation between two objects. This is the processed form of the sentence that will be stored in KR Database 115.

3.3.2 Relation Revealing Formula

If a relative clause modifies a proper name, it is possible to identify relations between the proper name and the constituents of the relative clause via a method called the Relation Revealing Formula (RRF). The RRF is a sublanguage approach (Sager et al, 1987) to analyzing texts. Sublanguage theory suggests that any type of text that is used for a common purpose within a group of individuals will develop characteristic syntax and semantics. A set of relative clauses, which modify one type of proper name, is assumed to constitute one sublanguage. Thus, for each sublanguage, it is possible to construct specific relation extraction rules based on: 1) typical attributes of a particular proper name category and 2) case frames, which are usually associated with the matrix verbs of sentences.

3.4 Special Semantic Relation based CRC Extractor

Certain linguistic constructions require specialized sets of rules to be applied in order to extract the proper meaning from a sentence. The Special Semantic Relation based CRC Extractor 205 extracts semantic relations, looking for specialized types of concepts and linguistic clues, including some prepositions, punctuation, or specialized phrases. For instance "based in" in the sentence, "Dragon Software, based in Podunk . . . " is a specialized phrase which signals a location. Semantic Relation specific CRC Extraction Rule Base 207, which is associated with this module, contains rules and linguistic clues for determining these special relations. This module relies heavily on the proper name and numeric concept categories established during document processing.

Location is an example of a set of special semantic relations for which specific rules have been developed to correctly interpret the meaning of text containing location information. Other semantic relation-specific rules are similarly constructed. For geographic location rules to be applied, the text needs to contain at least one proper name which is classified as a geographic location category such as, City, Port, Airport, Island, Country, Province, Country, Continent, Region, Body of Water, Geographic Misc., Road, and Compounded Country Names (see Table 1). If the text contains a proper name in one of these categories, then the surrounding text is checked against the rule base for appropriate matches. If the surrounding text also matches with one of the pre-specified rule patterns, then CRCs are extracted according to the rule.

Examples of sentences which contain linguistic patterns which signal location, but require special pattern rules are:

They had no jurisdiction over tunnels within New York City.

He explored the tunnels under Paris.

Haiyashi, the large Tokyo firm, today announced that . . .

The late Chinese leader has often been quoted by Deng.

In early New York trading, the stock market rebounded. The last three examples all demonstrate a geographic name which modifies the following noun. The first two examples demonstrate the variety of wording which can convey the same idea, namely, tunnels under (in) a city.

The following describes rules that are used to evaluate texts to extract CRCs when the semantic relation is location (LOC).

| POS notations used in the rules: | |
|---|---|
| LOC_PN: | geographic proper name |
| NN: | noun (both singular and plural forms) |
| PERSON_PN | person proper name |
| PN: | proper name |
| VBD: | past tense verb |
| VBP: | is/are/were/had been |
| Semantic relations used in the rules: | |
| AFFL | affiliation |
| LOC: | location |
| NAME: | name |
| CRC Extraction Rules: | |
| ". . ." | zero or more words |
| "/" | optionality |
| "+" | one or more words which belong to the same part-of-speech as the preceding word |
| 1. pattern: | . . . PN/NN/NNS+ on/in LOC_PN island/state/province |
| . . . | |
| CRC: | island/state/province -> (NAME) -> LOC_PN |
| | NP/NN/NNS+ -> (LOC) -> LOC_PN |
| example: pattern: | Seneca County in New York state |
| CRC: | state -> (NAME) -> New_York |
| | Seneca County ->(LCC) ->New_York |
| 2. pattern: | . . . VBD in LOC_PN . . . |
| CRC: | VBD -> (LOC) -> LOC_PN |
| example: pattern: | settled in Hawaii |
| CRC: | settle -> (LOC) -> Hawaii |
| 3. pattern: | . . . PERSON_PN of/from LOC_PN. . . |
| CRC: | PERSON_PN -> (AFFL) -> LCC_PN |
| example: pattern: | Joe_Skeen of New Mexico |
| CRC: | Joe_Skeen -> (AFFL) -> New_Mexico |
| 4. pattern: | . . . NN/NNS+ within LOC_PN. . . |
| CRC: | NN/NNS+ -> (LOC) -> LOC_PN |
| example: pattern: | tunnels within New York City |
| CRC: | tunnels -> (LOC) -> New_York$_{13}$ City |
| 5. pattern: | . . . NN/NNS+ VBP in LOC_PN. . . |
| CRC: | NN/NNS+ -> (LOC) -> LOC_PN |
| example: pattern: | cattle raisers were in Syracuse |
| CRC: | cattle_raisers -> (LOC) -> Syracuse |

For each of these patterns, as well as others in different semantic categories, the rule base contains specific rules which govern how the sentence is parsed and CRC's are extracted.

For example, the following are rule patterns used to extract quantity relations when a gerund is followed a cardinal number and followed by plural nouns. The CRC format is represented here as Relation-Concept-Concept. VBG stands for gerund, CD stands for cardinal number and NNS stands for plural noun.

rule: A|VBG B|CD C|NNS

QTY (A, C: B)

example: employing|VBG 300|CD people|NNS

QTY (employing, people: 300)

3.5 Syntactic Relation to Semantic Relation Mapper

Syntactic Relation to Semantic Relation Mapper 210 (optional module to be used with the Syntactic Parser output) maps syntactic relations such as "subject of the transitive verb" to their semantic functional equivalents so that a subject of a verb might be described as "agent of the action" of a verb. For example, in the sentence "Mr. MacGregor hoed his lettuce patch," Mr. MacGregor is the subject of the transitive verb "to hoe," and this is mapped to the semantic relation which describes Mr. MacGregor as "Agent" of the action. Rules for mapping to semantic relations are contained in Mapping Rule Base 212.

In the current embodiment, Syntactic Parser 175 is implemented using LINK GRAMMAR PARSER from Carnegie Mellon University. This parser generates certain syntactic relations such as "Ss," which are mapped to CHESS semantic relations, in this case, "AGNT." Similarly, the syntactic relation, "Em" (a type of modification relation) is mapped to "MANR" (a semantic relation showing an attribute of an act in the CHESS system).

Figure 4B:
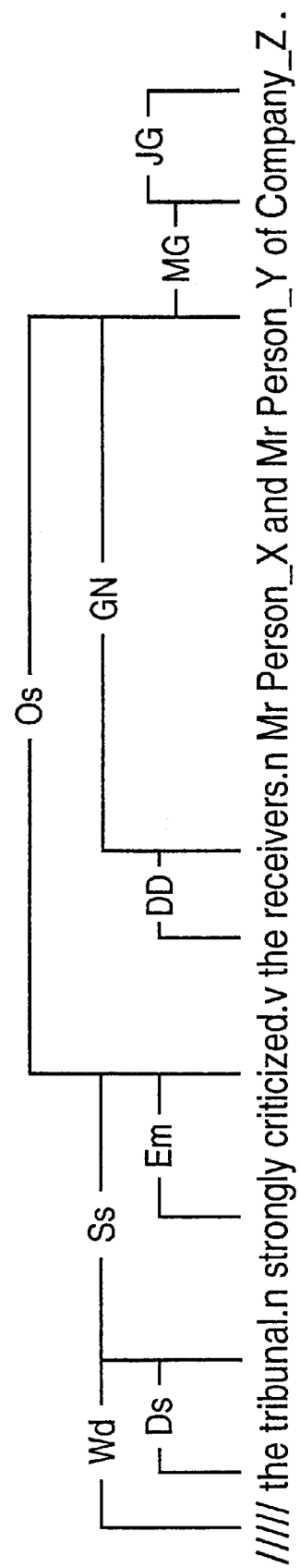
FIG. 4B shows the output of the syntactic parser.

FIG. 4B shows the output of Syntactic Parser 175. The example uses this sentence: "The tribunal strongly criticized the receiver, Mr Person_X and Mr Person_Y of Company_Z."

The following shows the syntactic relations (links) and semantic relations which are shown in the example sentence:

Syntactic Relations:

DD: connects definite determiners to number expressions

Ds: connects the determiners to nouns

Em: is used for verb-modifying adverbs which precede the verb

GN: connects a proper noun to a preceding common noun which introduces it

JG: connects certain prepositions to proper-noun objects

MG: allows certain prepositions to modify proper nouns

Os: connects transitive verbs to their objects, direct or indirect

Ss: connects subject nouns to finite verbs

Wd: connects the subjects of main clauses to the wall

Semantic Relations (see Table 2):

AGNT: agent

MANR: manner

OBJ: object

ISA: is a

AFFL: affiliation

The following shows how CRCs are extracted from the syntactic links in the parse output of the example sentence by identifying words, or phrases connected by links, and translated into CRCs:

1) link→Concept, Concept: Ss→tribunal.n, criticized.v

CRC: criticized→(AGNT)→tribunal 2) link→Concept, Concept: Em→strongly, criticized.v CRC: criticized→(MANR)→strongly 3) link→Concept, Concept: Os→criticized.v, receivers.n Mr Person_X and Mr Person_Y CRC: criticized→(OBJ)→receivers CRC: criticized→(OBJ)→Mr Person_X
CRC: criticized→(OBJ)→Mr Person_Y
4) link→Concept, Concept: GN→receivers.n, Mr Person_X and Mr Person_Y
CRC: Mr Person_X→(ISA)→receivers
CRC: Mr Person_Y→(ISA)→receivers
5) link→Concept, Concept: MG\JG→Mr Person_X and Mr Person_Y, Company_Z
CRC: Mr Person_X→(AFFL)→Company_Z
CRC: Mr Person_Y→(AFFL)→Company_Z Syntactic Relation to Semantic Relation mapper 210 is significant in broadening the ability of CHESS to process non-redundant text types. By incorporating a grammatical rule base which recognizes a larger variety of linguistic constructions, repetitive versions of the same story are no longer necessary. Using the syntactic parser and syntactic relation to semantic relation mapper, other grammatical/linguistic constructions can be detected and used as a source for CRC extraction.

The following shows commonly used rules from the current embodiment:
Step 1: Words joined by any of the following links, should be joined together. If any word in the phrase is then connected to another word, connect the entire phrase.
Syntactic Relations:
AN
G
EN
NN
TA
TY
If
I
Ix
Pgf
Pvf
Pv
Ppf
IDXD
DTn

EXAMPLES

| | |
|---|---|
| G: Mr, Person | Mr_Person |
| G: Person, X | Mr Person_X |
| GN: receivers, X | receivers, Mr_Person_X |

Step 2: Identify words, or phrases, connected by links and the link connecting them.
Step 3: Translate syntactic relations and their arguments into CRCs.
Ss→AGNT→(verb, noun)
Em→MANR→(verb, adverb)
Os→OBJ→(verb, noun)
GN→ISA→(PN, noun)
Sp→AGNT→(verb, noun)
Ox→OBJ→(verb, noun)
Osn→OBJ→(verb, noun)
A→CHRC→(noun, adjective)
Spx (PV)→EXPR→(verb, noun)
MVp (TD)→PTIM→(verb, *)
* denotes a non-specific part of speech (It doesn't matter what it is).
() denotes that the link in parentheses must have been connected to the phrase to insure the relation. One of the concepts will be a phrase that was connected because of the presence of this link.

3.6 Temporal Information Extractor

Temporal Information Extractor 215 time stamps extracted information in order to allow CHESS to present it to the user as part of an automatically constructed timeline for any named entity. This module supplies the functionality, by extracting time-related concepts, for CHESS to build an automatic biography or history for any entity for any period covered by the database. This is used in historical studies, as well as in competitive intelligence. It is used to track emerging trends, products, or changes in an entities' behavior. For instance, a company could be demonstrated to release new products every two years. Congress could be tracked for new emphases such as increases or decreases in numbers of environmental bills passed.

A timeline for any named entity is constructed on the fly by CHESS at the user's request when inputting a query (see section 6.0, Similarity Measurer, for a description of how to retrieve a timeline).

Temporal Information Extractor 215 extracts information which has a time element. Typically, news articles contain two sources of temporal information. The first is found in the date field, and gives the date on which the article was published. Publication dates are extracted at the document processing stage. However the actual time of occurrence of an event will be extracted directly from the text if a point-in-time relation exists within the document. For instance, a newspaper report of a train crash in Katmandu will be dated the day that the event was reported. However, it might have actually occurred two days previously. The Temporal Information Extractor will extract the actual time of occurrence. Point-in-Time Semantic Relation Rule Base 217 contains rules for extracting point-in-time information from text.

As an example of the kinds of rules contained in rule base 217, "If a point in time pattern occurs between the words of a verb phrase, then connect the point in time pattern with the verb that follows that pattern." For example: In the phrase "had in 1992 filed," the following CRC is extracted:

(C) file→(r) [ptim]→(c)1992

3.7 CRC Combiner

The output from the four CRC Extraction modules is fed into the CRC Combiner 220 which removes redundant CRCs extracted by the different modules. If the modules extract different relations, the CRC Combiner resolves this conflict based on a pre-defined order of priority which gives preference to first, relations defined in the Special Linguistic Construction based CRC Extractor, followed by those from modules 205, then 215, and then 210.

It is possible for some CRCs to include at least one embedded CRC. For example, in the following sentence:
Person_X declared that Person_Y will be the president of Company_Z.
The CRCs extracted from the subordinate clauses which begins with the relative pronoun, "that" are:
Person_Y→(ISA)→president
Person_Y→(AFFL)→Company_Z
The CRCs extracted from the main clause are:
Person_X→(AGNT)→declare
declare→(SUBJ)→?
Semantically, the second CRC from the main clause needs take the CRCs that are extracted from the subordinate clause as the value for the missing concept. Thus, this operation requires embedding of CRCs. The following shows the second CRC from the main clause with the embedded CRCs:

declare→(SUBJ)→Person_Y→(ISA)→president
Person_Y→(AFFL)→Company_Z

As can be seen in Table 2, ISA represents the "is a" relation; AFFL represents the "affiliation" relation; AGNT represents the "agent" relation; and SUBJ represents the "subject" relation.

Output from the CRC Extraction Module includes CRCs and temporal information, and is sent to CRC-to-KR Translator 110.

4.0 CRC to Knowledge Representation (KR) Translator

Figure 5:
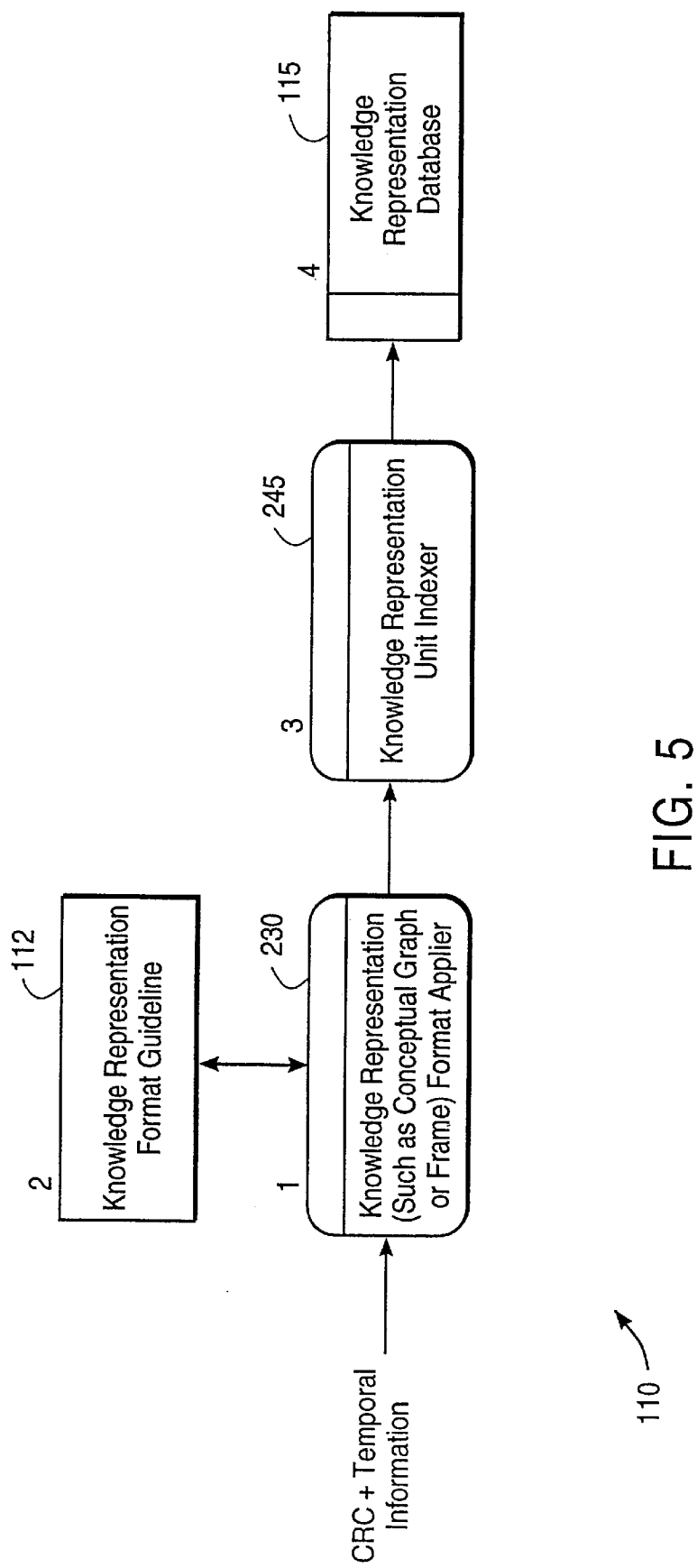
FIG. 5 is a block diagram showing the CRC to Knowledge Representation (KR) Translator for documents.

FIG. 5 is a block diagram showing CRC-to-KR Translator 110, which is used for documents. The Translator converts extracted CRCs to a KR scheme. In this specific embodiment, Conceptual Graphs are used as the KR scheme. However, a frame based KR scheme, as well as other KR schemes are equally applicable, and are being used in other embodiments.

The CRC to KR translator includes a KR Format Applier 230 and a KR Unit Indexer 245. The KR Format Applier uses KR Format Guideline 112 as a knowledge base by converting the CRCs to a format which can be accepted by the KR scheme, in this embodiment, conceptual graphs. The converted CRCs are then organized into conceptual graphs which graphically describe concepts and their relations as well as attached temporal information.

A conceptual graph is created for each clause in a given text. CRCs from one clause form a conceptual graph. Thus, it is necessary for source information to be included in each extracted CRC. The source information consists of the unique identification for the clause from which the CRC is extracted; the unique id of the sentence from which the clause extracted; and the unique id of the document from which the sentence extracted.

The conceptual graphs are indexed by KR Unit Indexer 245 and stored in KR Database 115 for faster access by Query KR to Document KR Similarity Measurer 55, which will be described below. It is not, however, necessary to index the KR units.

A current implementation of the KR guideline is set forth in Table 3, located in a later section.

4.1 KR Database

The KR Database provides a data organization structure for storing and retrieving CRCs. This can be provided by using any of several traditional database schemes: a COTS relational database, or an object oriented database (OODB). The first requirement is that the system allow the incremental addition of KR Units to the database. The second requirement is that the similarity measurer must be able to access the KR Units, or the CRCs and their components at any of several levels. In the current embodiment, an OODB is used. OODBs have a better capability for supporting complex, recursive and rapidly changing data in comparison to traditional relational databases. In a previous embodiment, the CRCs were merged into a semantic network, but other data organizations are also possible.

5.0 Query Processing

Figure 6:
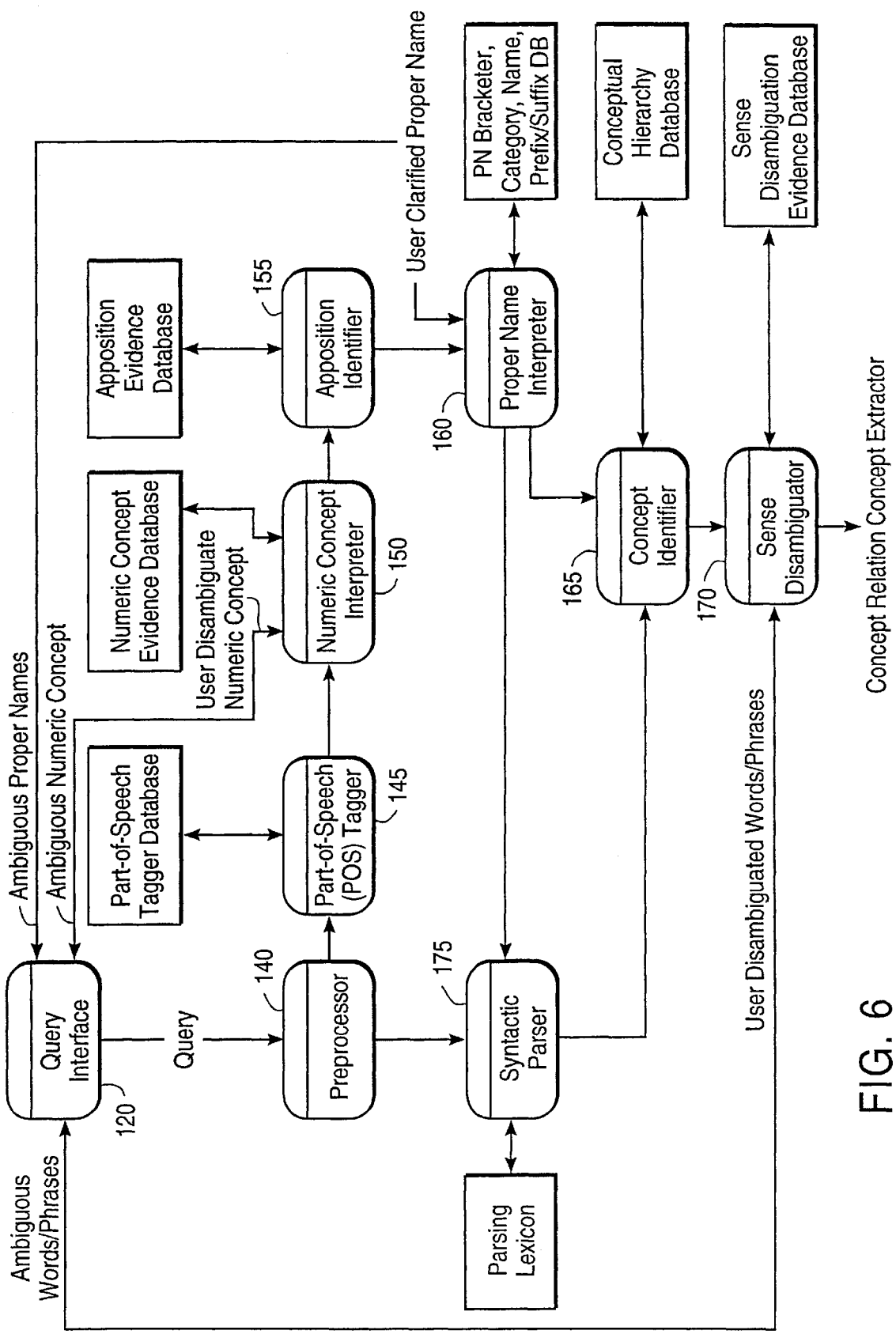
FIG. 6 is a block diagram showing query processing performed by the system prior to CRC extraction.

FIG. 6 is a block diagram showing query processing performed by the system prior to CRC extraction. The modules that make up Query Processing module 100' are the same as those that make up Document Processing module 100, and the same reference numerals are used as in FIG. 3.

Query processing differs from document processing, however, in that the user interacts with the system as part of the clarifying and disambiguation process. Users enter specific questions or queries through Query Interface 120, which passes the query to be processed to Preprocessor 140, POS Tagger 145, Numeric Concept Interpreter 150, Apposition Identifier 155, Proper Name Interpreter 160, Syntactic Parser 175, Concept Identifier 165, and Sense Disambiguator 170, with their associated knowledge bases as described above in the Document Processing section.

Clarification of numeric concepts is invited by the system if numeric concepts in the query are vague. All possible interpretations of the concepts are returned to the user at this point so that the user can select the appropriate interpretation (s).

Similarly, ambiguous proper names are returned to the user from the Proper Name Interpreter so that they can be clarified. A list of all candidate names is supplied and the user is asked to choose the appropriate one(s). The Sense Disambiguator also returns a list of candidate meanings for the user to clarify by choosing the ones he intended in his query.

Figure 7:
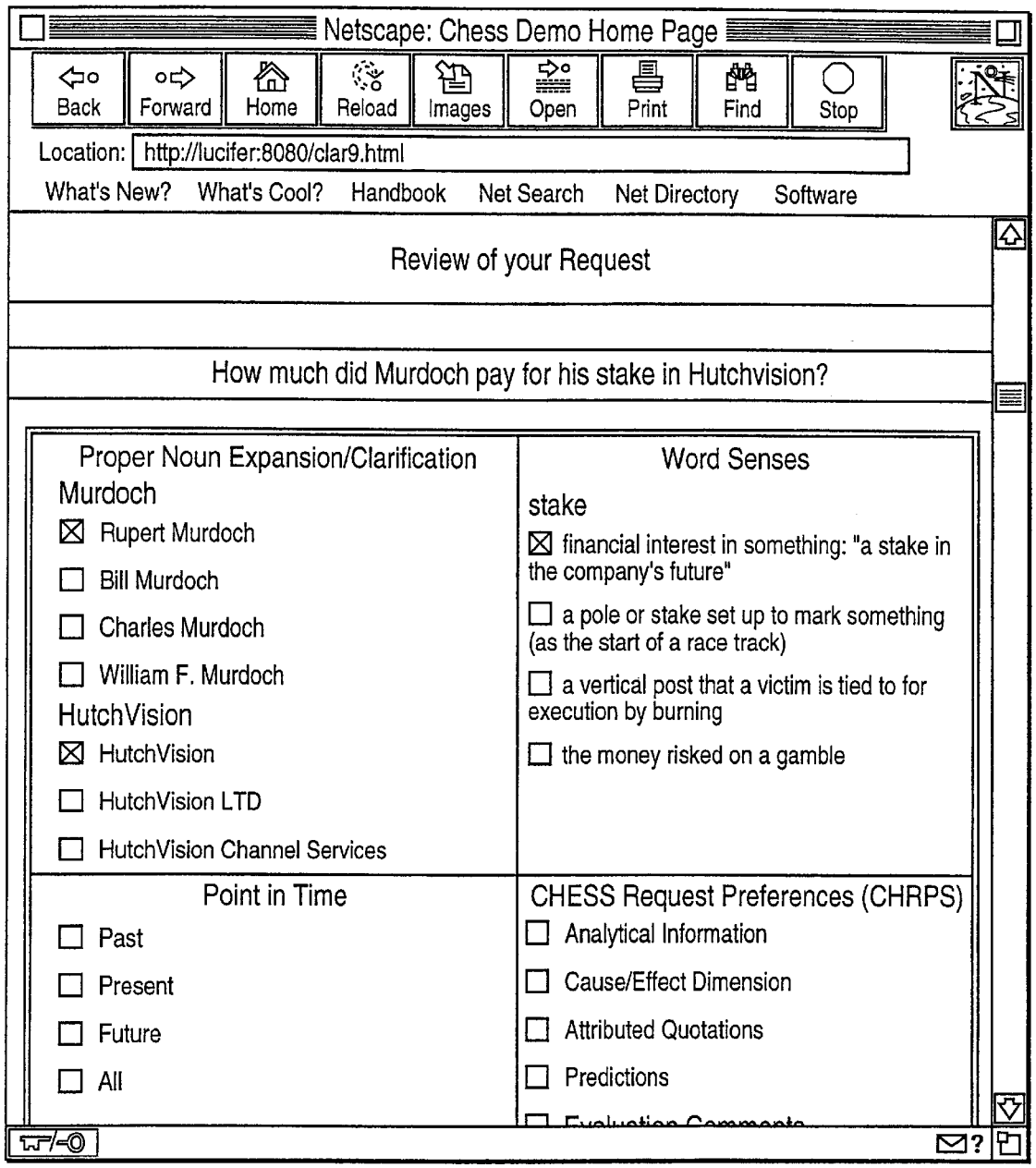
FIG. 7 is a representation of the sense disambiguation screen displayed during query processing.

FIG. 7 is a representation of the sense disambiguation screen displayed during query processing. Note that this screen shot is intended as an example and in no way limits the screen design or functionality to this particular interface design.

CRC extraction for queries also follows the same path as described above in connection with CRC Extractor 105, and will not be separately illustrated or described.

Figure 8:
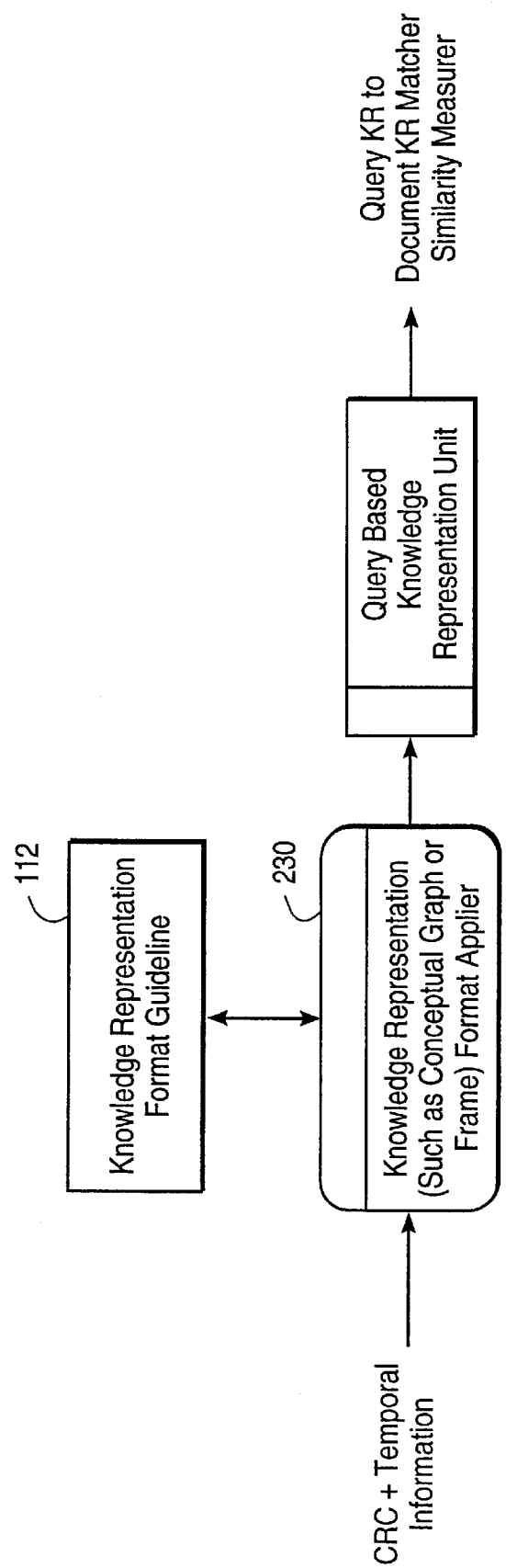
FIG. 8 is a block diagram showing the CRC-to-KR Translator for queries.

FIG. 8 is a block diagram showing CRC-to-KR Translator 110', which is used for queries. The query translation module maps CRCs to the appropriate KR scheme, as it does in Document Processing, but the output is not indexed or stored in the KR database. Instead, it is passed to Query KR to Document KR Similarity Measurer 55. CRCs are the building blocks for Knowledge Representation Units. A KR Unit can consist of several CRCs. Each KR Unit can also consist of several KR units.

6.0 Similarity Measurer

6.1 Matching

Figure 9:
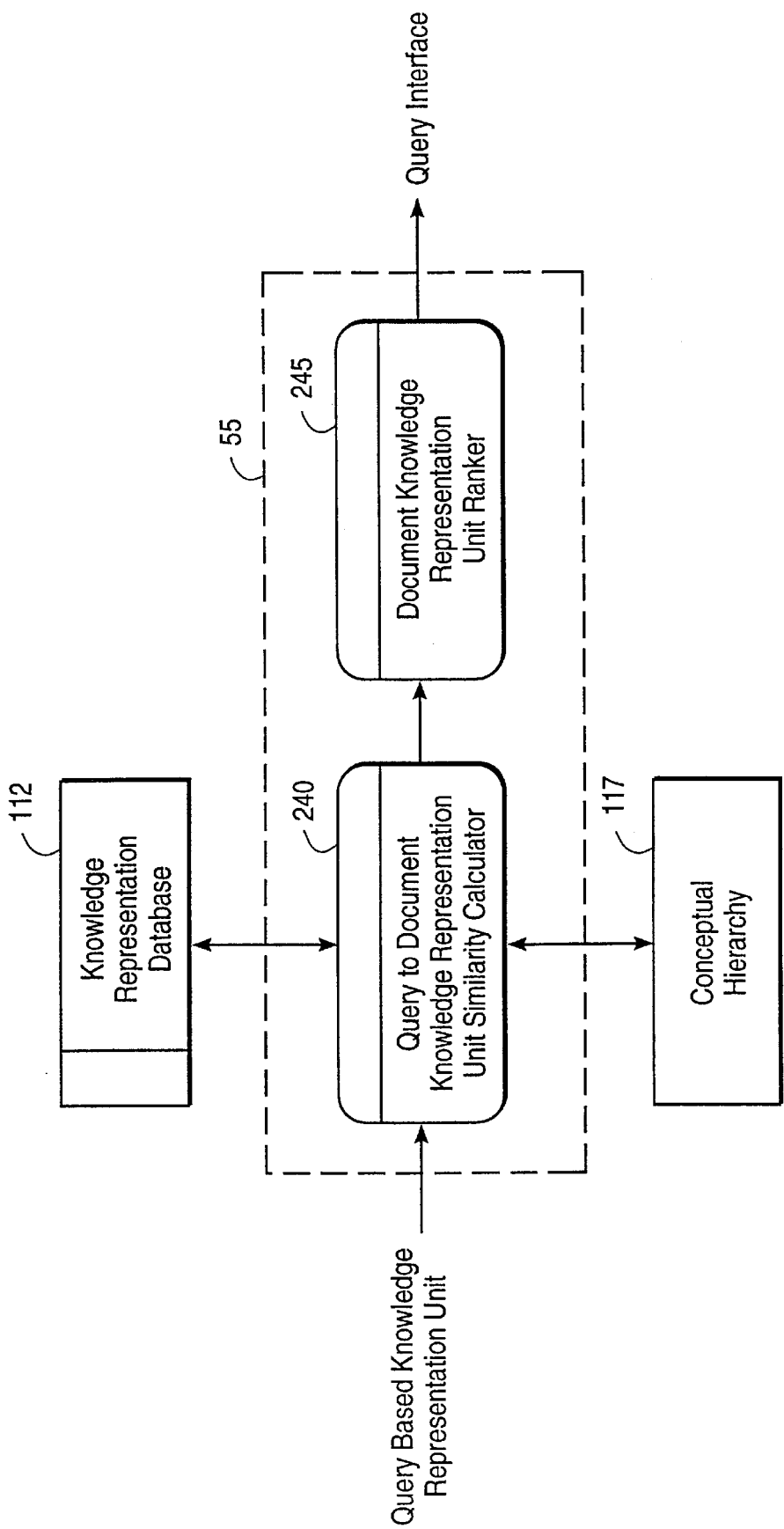
FIG. 9 is a block diagram showing the Similarity Measurer.

FIG. 9 is a block diagram showing Similarity Measurer 55, which includes a Query to Document KR Unit Similarity Calculator 240 and a Document KR Unit Ranker 245. The Query to Document KR Unit Similarity Calculator measures the degree of similarity between the Query KR unit(s) and every KR unit in KR database 115. In the current embodiment, conceptual graphs generated from queries are matched against the conceptual graphs in the KR knowledge base. Basically, the degree of similarity is calculated by counting how many of the same concepts and relations are found in both the Query KR units and each KR unit in the database (i.e., the number of concepts and relations which are the same in both). In the specific embodiment described herein, the conceptual graph matching engine is a graph matcher which considers the conceptual graph as a primitive set of objects and mathematical relations over those objects. The principle behind the matcher is to process many graph comparisons in parallel by taking advantage of their shared node descriptions and by noting that a graph itself is the best descriptor of nodes.

For each concept in the query CG, both any exact match to that concept and those which are hyponymically related are retrieved as the first step in the matching process. In other words, the concept and any more specific term related to that concept or relation are retrieved. Then, the relations are similarly matched so that the relation as well as the concept and related terms match. Partial matches in which the concept matches, but the relation does not, are discarded. In the current embodiment, a non-match with the second concept is also discarded. However, any CG which contains everything in the query CG, but also retrieves extra information is kept.

Conceptual Hierarchy knowledge base 117 is organized hierarchically and is used by Similarity Calculator 240 to locate related, as well as narrower or broader concepts. In this specific embodiment, CHESS finds only narrower relations. Related concepts are treated as partial as opposed to full matches. Semantic relations are also organized hierarchically. Here too, measurement of similarity is calculated for similar but not exact match relations as partial matches.

Document Knowledge Representation Unit Ranker 245 sorts and ranks the output of similarity values from the Calculator to list the most similar KR units at the top of a ranked list, with the least close matches at the bottom. This ranked list is passed back to Query Interface 120 where it is displayed for the user.

6.2 Query Output Formats

Output from the Similarity Measurer is displayed as the answer to a query. At query input, the user is asked to define a preferred output format. Initial responses from the system can be either a direct answer to a question (see below), or the original source document which contains the answer. The preferred output can be changed for any question. Direct answers are provided usually to either W-H or yes/no questions.

6.3 W-H Questions

In response to W-H questions, CHESS selects the concept to which a pronoun in a W-H question refers. For instance, in the question, "Who won the World Series in 1996?", CHESS would select "The Yankees" to replace the pronoun, "who". In this case, "Yankees" would be the top-ranked KR Unit presented by Document KR Unit Ranker 245. The selected concept is shown to the user as the answer to a W-H question. The user has the following choices at this point. They are:

1) View the answer from the next ranked KR Unit;
2) Enter a request to retrieve the source text at Query Interface 120 from which the matching KR Unit was generated (the user can specify the source text to be any number of words in the source text from a clause to a document);
3) Construct a timeline for the following person, place or thing: (fill in the blank)
4) Enter a request at the Query Interface 120 to access the Browser; or
5) Enter a new or revised query.

This process is iterative, so that a user can view any number of ranked answers to the query.

6.4 Yes-No Questions

In response to Yes/No (verification) questions, if the Similarity Measurer finds at least one KR Unit which matches to the query, then the user is notified that a confirming instance of the query has been found. The user has the following choices at this point. They are:

1) Enter a request to retrieve the source text at Query Interface 120 from which the matching KR Unit was generated (the user can specify the source text to be any number of words in the source text from a clause to a document);
2) Construct a timeline for the following person, place or thing: (fill in the blank)
3) Enter a request at the Query Interface 120 to access the Browser; or
4) Enter a new or revised query.

For example, if the query is: "Did Rupert Murdoch own the New York Post in early 80s?" Then the system will display the statement, "Yes. CHESS confirms that Rupert-Murdoch owned the New York Post in the early '80's". This response indicates that there was at least one matching KR Unit found in the KR Database. The user can request to see the source sentence from which the KR Unit is extracted. Then the system shows the sentence:

Mr Rupert Murdoch owned The New York Post from 1976 to 1988. (Mar. 30, 1993, Financial Times)

6.5 Proposition Questions

Proposition questions can be either W-H or yes/no questions. Examples would be, "Is isoniazid the drug of choice in treating tuberculosis", or "Who won the World Series in 1996?". They differ in the response which the system provides. In proposition questions, if the Similarity Measurer finds at least one KR Unit which matches the query, the user is shown the source text which matches the topic content of the query immediately. At this point, the user is offered the following choices:

1) View the entire source document.
2) Enter a request at Query Interface 120 to access the Browser; or
3) Enter a new or revised query.

7.0 Browser

Figure 10:
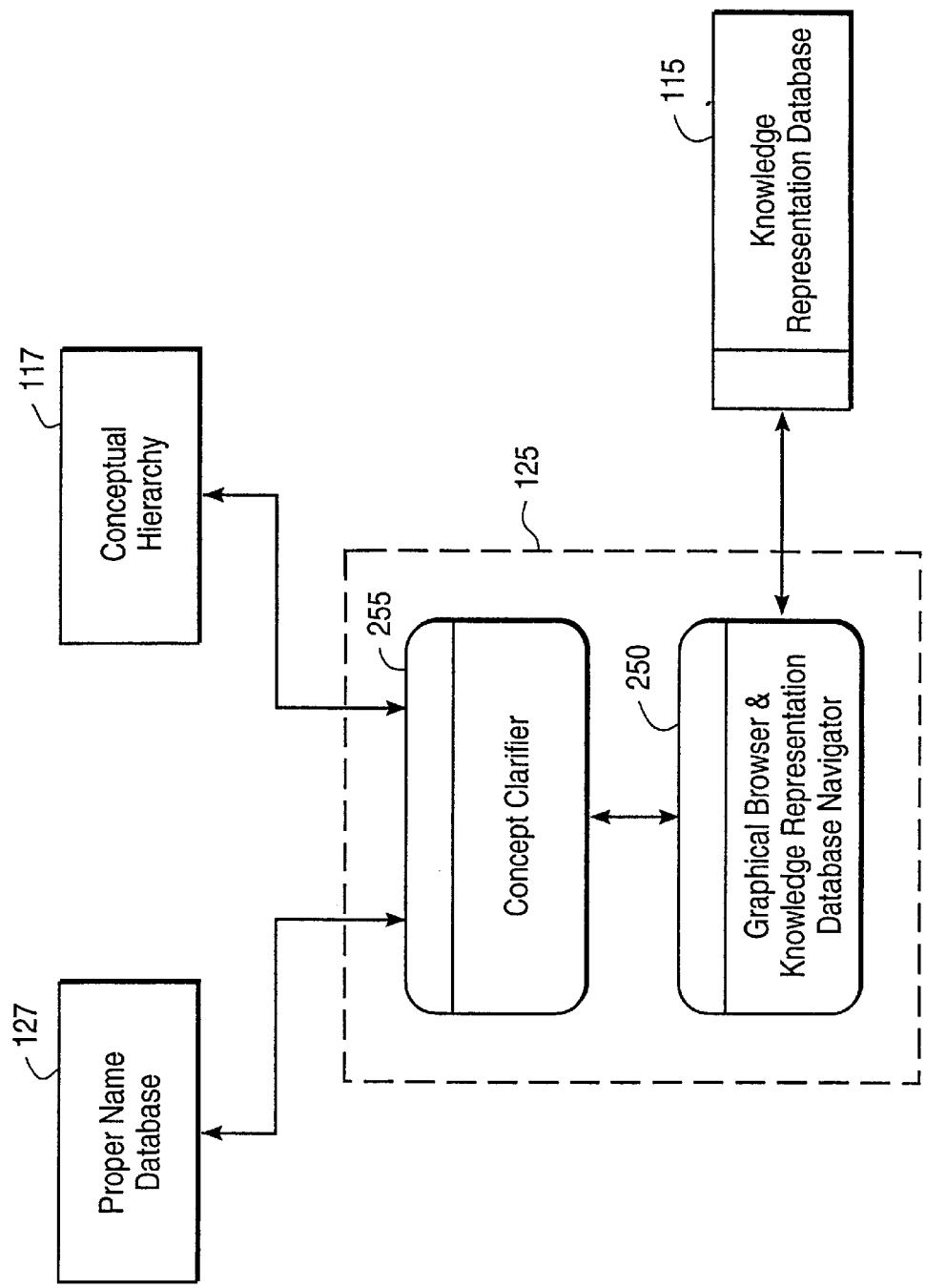
FIG. 10 is a block diagram showing the browser.

FIG. 10 is a block diagram showing Browser 125 and its associated databases. The Browser is intended to answer vague questions that cannot be phrased as W-H questions. An example of such a non-W-H question is "Is there any information about Jascha Heifetz?" The browser includes a Graphical Browser and KR Database Navigator 250 and a Concept Clarifier 255.

The Graphical Browser and KR Database Navigator takes a chosen name or concept as input and passes it to the Concept Clarifier to determine if that concept is ambiguous. Ambiguous names may be names which exist in several forms within the database: Is the "Smith" in the query John Smith or Alice Smith? Similarly an ambiguous concept may have several senses as in "green plant" or "manufacturing plant." The Concept Clarifier retrieves all possible variants from Proper Name Database 127 or Conceptual Hierarchy 117, and then sends the list of all possible variants of the name back to the Browser. The user can then select those which fill his or her requirements. Once ambiguities have been resolved, the browsing query is sent to KR database 115 to retrieve all KR units which match the requested concept. These are displayed to the user as a graphically depicted set of relations for browsing or navigation.

FIG. 11 is a representation of the browser screen. Note that this screen shot is intended as an example and in no way limits the screen design or functionality for this particular interface design.

The browser shows the graphical view of all information about Robert Dole which is stored in the KR Database 115. The concept which represents Robert Dole is shown in the middle of the screen. The screen is the one which will be shown to the user after the concept clarification regarding Robert Dole is completed.

The user can scroll up/down and left/right to reveal information which is not shown on the screen due to screen size constraints. In addition, the user can change the focus of information displayed by selecting any concept viewed on the screen.

8.0 Alternative Embodiment

In a further embodiment of CHESS, the system becomes a proposition-based answer-providing system. which preserves the integrity of the propositions which comprise the raw data and extracts only enough content from these propositions to ensure that they are returned when they are responsive to a user's query. This approach contrasts with the current embodiment of the system architecture which decomposes text into subsentential atoms of data which are intended to capture all of the content conveyed by the text. The proposition-based system preserves propositional integrity. If propositional integrity is maintained, the output of the proposition-based system is more precise and its architecture is much simpler than those of the traditional approach. Since the system retrieves complete propositions rather than elements of formatted data, there is no need to provide the apparatus for rendering sentences into these data and then reprocessing them later so that the average user can understand them. This alternative embodiment increases the precision of the retrieval because sentences are not translated into the formalism and then retranslated for the user.

In this further embodiment, sentences which are input in the document processing module are tagged in such a way that all of their topical content is clearly revealed. Text expresses two sorts of content: topical content and logical content. Topical content is the set of subjects which are addressed by a text, while logical content is the scaffolding which indicates how these subjects are related to one another. Topical content is conveyed by content words like "interested," "trees," "houses," "humans," etc. and phrases formed from such words, while logical content is expressed by truth-functional connectives (e.g., "and" and "not"), quantifiers (e.g., "all" and "some"), modal operators (e.g., "necessary" and "possible"), and clausal relations (e.g., "since" and "because"). Although logical content is very important for determining the truth conditions of what is said, it is not needed for defining the topics expressed by a given text. The distinction between topical and logical content can be clarified with some notions from formal logic. Topical content is the set of predicate/argument relations which characterize a text. Logical content is the set of logical operators which govern these relations.

Since this further embodiment extracts the topical content of texts, only eight conceptual relations are needed. These relations are either grammatical functions or relations that are correlated with W-H question words. They are:
semantic (as opposed to grammatical) subject,
semantic object,
verbal complement,
location,
quantity,
point-of-time,
modifier, and
destination.

It is fairly easy to see why this is so. First of all, since the representation scheme for the information extraction module does not concern itself with logical content, conceptual relations like negation, possibility, necessity, conditional, and cause do not have to be represented. Verbal complement is a relation between a verb and any modifying adverb or prepositional phrase. This relation is a feature of the further embodiment representation scheme, and is intended to subsume many much more precise relations such as destination, frequency, instrument, manner, argument, accompaniment, part, path, source, etc. The motivation for replacing these more specific relations with the general notion of verbal complement is that typically a verb and its complement uniquely specify the nature of the relation between them. The relations of location, quantity, and point-of-time are not subsumed under the general verbal complement relation, because they correspond to the w-h pronouns "where," "how much" or "how long," and "when" which will be used to frame queries to the retrieval module. Finally, the modifier relation will be used to capture the head/modifier relation between nouns and adjectives, nouns and nouns, nouns and the objects of prepositional phrases, adjectives and adverbs, and adjectives and prepositional phrases.

There are several distinguishing features of this proposition-based system. Chief among them is that this system is simpler than the standard system. For one thing, the most complex and elusive semantic relations expressed by natural language do not have to be extracted from input text. These relations include logical and clausal relations, propositional attitudes, and the semantic relations implicit in compounded nouns. For another thing, the semantic relations which are extracted from raw text are very limited in number and general in nature. Still another significant advantage of the proposition-based system is that it is much more accurate than the standard system. The reason for this is, once again, that sentential integrity is maintained. The sentences comprising documents are not translated into a formalism which then replaces the original sentences and which then has to be retranslated into a surveyable format for the average user. Instead, the original sentences are retained and are merely labelled with appropriate tags regarding the topics addressed by them. Thus, the proposition-based system has higher precision than the standard system, because information retrieved from the latter system has been processed/translated twice, while the facts that the proposition-based system displays to the user have precisely the same form which they had when they were originally input into the system.

Given this explanation of the distinction between the two sorts of content, it is easy to see how the proposition-based system would retrieve answers to queries. Each sentence of the input raw text would first be correlated with the concepts and relations that capture the topical content expressed by the sentence. When a user issues a query to the system, the query will also be associated with the appropriate topic-determining concepts and relations, and these concepts and relations are matched against the database. The system then returns the sentences that match on these concepts and relations and ranks these sentences in order from shortest to longest.

9.0 Tables

TABLE 1

Proper Name Categories

| ID | Category Name | Example |
|---|---|---|
| 1 | City | Baton Rouge |
| 2 | Port | Yokohama |
| 3 | Airport | Heathrow |
| 4 | Island | Grand Manaan |
| 5 | County | Tompkins |
| 6 | Province | New Brunswick |
| 7 | Country | Hungary |
| 8 | Continent | Africa |
| 9 | Region | Far East |
| 10 | Body of Water | Lake Michigan |
| 11 | Geographic Misc | Crawford Ave. |
| 12 | Road | Mass Turnpike |

TABLE 1-continued

Proper Name Categories

| ID | Category Name | Example |
|---|---|---|
| 15 | Religion | Buddhism |
| 17 | Nationality | Korean |
| 18 | compounded country names | Sino-Soviet |
| 19 | Regionality (other than nation) | North American |
| 20 | Company | Textwise, Inc. |
| 21 | Company type | Savings and Loan |
| 25 | Financial Info | Dow Jones Industrial Average |
| 28 | Sports Franchise | Phoenix Suns |
| 30 | Person | Itzak Perlman |
| 31 | Title | Professor |
| 40 | Government | Parliament |
| 411 | U.S. Federal Government-Legislative Branch | Library of Congress |
| 412 | U.S. Federal Government-Judicial Branch | Supreme Court |
| 413 | U.S. Federal Government-Executive Branch | U.S. Information Agency |
| 414 | U.S. Federal Government-Independent Establishments & Government Corporations | National Science Foundation |
| 415 | U.S. Federal Government-Boards, Commissions, and Committees | Federal Reserve Board |
| 416 | United States Federal Government-Quasi-Official Agencies | Smithsonian Institution |
| 417 | United States Federal Government- Other Federal Agencies | Inter-American Development Bank |
| 42 | Government Programs | Strategic Defense Initiative |
| 45 | Treaties, Laws, Acts | Disarmament Treaties |
| 50 | Organizations | Sierra Club |
| 51 | Educational/Arts Services | Syracuse University |
| 52 | political organizations | Republican Party |
| 53 | Religious organizations | Church of Latter Day Saints |
| 60 | Software | DR-LINK |
| 65 | Hardware | Apple |
| 70 | Machines | Jeep |
| 73 | Periodicals, books, & Mass Media Products | New Yorker |
| 75 | Stationary Artifacts | Coliseum |
| 76 | Consumer Goods/products | Kleenex |
| 80 | Diseases | Mumps |
| 85 | Drugs | prozac |
| 88 | Chemicals | Agent orange |
| 89 | Organic Matter | DNA |
| 90 | Date | February 12 |
| 91 | Time | noon |
| 92 | Holidays | Halloween |
| 93 | Monetary Unit | Guilder |
| 95 | Events | World War I |
| 98 | Known Miscellaneous | Artificial Intelligence |
| 99 | Miscellaneous | lavender |

TABLE 2

Relations
CHESS relations (adapted from Sowa, 1984):
Conceptual Graph Relations Entity — includes objects and abstractions
Animate — agents of action
Act — event with animate agent
Event — actions and happenings; experience flux
Proposition — type of symbolic information
State — has duration

| | | |
|---|---|---|
| ACCM | (entity-x, entity-y) | |
| | x is accompanying y | |
| AFFL | (animate, group) | |
| | animate is affiliated with group or individual | |
| AGNT | (act, animate) | |
| | animate is performer(agent) of action | |
| | think is an act performed on propositions | |
| | wear, work | |
| ARG | (function, data) | |
| | for mathematical expressions | |
| ATTR | (entity-x, entity-y) | |
| | x has attribute y | |
| | attribute is accidental, characteristic is essential | |
| | color | |
| CAUS | (state-x, state-y) | |
| | x has a cause y | |
| CHRC | (entity-x, entity-y) | |
| | x has characteristic y | |
| | characteristic is an essential attribute | |
| | age | |
| CHLD | (person-x, person-y) | |
| | x has child y | |
| COND | (state-x, state-y) | |
| | if x then y | |
| CONT | (entity-x, entity-y) for physical entities | |
| | x has content y | |
| | y is in interior of x | |
| DEST | (act, entity) | |
| | action is directed toward entity | |
| DUR | (state, time-period) | |
| | state lasts time-period | |
| EXPR | (state, animate) | |
| | state is experienced by animate | |
| | know, believe, love | |
| FREQ | (event, time-set) | |
| | event occurs in time-set frequency | |
| INIT | (act, animate) | |
| | act is initiated but not performed by animate | |
| INST | (act, entity) | |
| | act is caused, in part, by instrument entity | |
| ISA | (animate, entity) | |
| | animate is an entity | |
| LINK | any relation | |
| LOC | (T, place) | |
| | T is linked to a place | |
| | act is linked to a place | |
| MANR | (act, attribute) | |
| | act has an attribute | |
| MATR | (act, substance) | |
| | act uses substance as medium | |
| MEAS | (dimension, specific measure) | |
| | ski has length | |
| | length has measure | |
| METH | (act-x, situation-y) | |
| | action-x is accomplished via situation-y | |
| NAME | (entity, name) | |
| | entity has name | |
| NECS | (proposition) | |
| | states proposition is necessarily true | |
| NEG | (proposition) | |
| | states proposition is false | |
| OBJ | (act/nominalized verb, entity/action) | |
| | act acts upon entity | |
| | nominalized verb refers to entity/action | |
| PART | (entity-x, entity-y) | |
| | entity-x has part entity-y | |
| | whole/part - includes wholes like group, crowd, those | |
| PAST | (proposition) | |
| | states proposition was true at some preceding time | |
| PATH | (act, place-set) | |
| | act occurred along place-set | |
| PTIM | (T, time) | |
| | T occurred at specific time | |
| POSS | (animate, entity) | |
| | animate possesses entity | |
| | animate possesses nominalized verb or abstraction | |
| PSBL | (proposition) | |
| | states proposition might be true | |
| PURP | (act-x, act-y) | |
| | act-x has purpose act-y | |

TABLE 2-continued

Relations
CHESS relations (adapted from Sowa, 1984):
Conceptual Graph Relations

|  | OR |
| --- | --- |
|  | (state/entity, act-y) |
|  | state has purpose act-y |
| QTY | (entity-set, number) |
|  | (x, count | number) |
|  | entity-set has number members |
| RCPT | (act/nominalized verb, animate) |
|  | act is received by animate |
|  | nominalized verb received by animate |
|  | (state, animate) |
|  | animate receives state |
|  | is state to animate |
| RSLT | (T1, T2) |
|  | T1 results in T2 |
| SRCE | (act, entity) |
|  | act originates from entity |
| SUBJ | (entity-x, entity-y) for abstractions |
|  | x has subject y |
|  | y is in interior of x |
| SUPP | (entity-x, entity-y) |
|  | x has support y |
| SUCC | (T1, T2) |
|  | T1 is followed by T2 |
| TITL | (name, title) |
|  | name has a title |
| UNTL | (state, time) |
|  | state ceases at time |

TABLE 3

Conceptual Graph Language Definition (KR Guideline)

| # | the following is the BNF (Backus Naur form) of the proposed language: |
| --- | --- |
| # | optional arguments are delimited within braces { } |
| # | verbatim items are enclosed within double quotes " " |
| # | the * (Kleene closure star) stands for any number of repetitions including zero |
| # | alternatives are separated by bars | |
| # | for now, tuple-tags have not yet been deemed necessary |
| CG | → cg-tag ":" "{" |
|  | tuple [":" DSPS] [":" tuple {":" DSPS] }* |
|  | "}" [":" struct-data] ":" |
| # | id must not be a known member of the cg-tag set so far cg-tag → id |
| tuple | → relation ":" |
|  | [arg {"," arg}* ] |
|  | ")" |
| # | no blanks allowed between components of DSPS |
| # | at this point a DSPS is still a single entity, |
| # | possibly (upon need) in the future it will be a list as well |
| DSPS | → doc "." section "." parag "." sent |
| struct-data | → [c-fieid] {"," [c-fieid] }* |
| relation | → relation-aux | |
|  | "(" |
|  | relation-aux {"," relation aux}* |
|  | ")" |
| # | id1 must be a member of the ontology and of type "relation" |
| # | id2 must be a numeric reference into the ontology where the |
| # | referent is of type "relation" relation-aux → id1 | id2 |
| arg | → [arg-tag ":"] inner-arg ["." num] |
| # | id must not be a known member of the arg-tag set |
| # | local to the current CG scope arg-tag → id |
| num | → short integer |
| inner-arg | → inner-arg-aux | |
|  | "(" |
|  | inner-arg-aux {"," inner-arg-aux }* |
|  | ")" |
| # | only choices 3 and 4 use the optional sub-limiter clause inner-arg-aux |
| → | 4-choices [sub-limiter] |
| # | id1 must be a member of the arg-tag set local to the CG scope |

TABLE 3-continued

Conceptual Graph Language Definition (KR Guideline)

| # | id2 must be a member of the cg-tag set |
| --- | --- |
| # | id3 must be a member of the ontology |
| # | id4 must be a numeric reference into the ontology |
| 4-choices | → id1 | |
|  | id2 | |
|  | id3 | |
|  | id4 | |
| sub-limiter | → "[" |
|  | semantic-num {"," semantic num }* |
|  | "]" |
| # | semantic-num must be within the range of the available meaning set |
| # | of the ontological reference semantic-num → short integer |
| # | to be determined, for now use as simple integers |
| doc | → integer |
| section | → integer |
| parag | → integer |
| sent | → integer |
| # | examples: |
| C1: { | |
|  | agnt (X: country[15, 28, 117], R: respond) |
|  | R2 (R, T1: terrorist.1), |
|  | loc (terrorist.2, (domestic, local)), |
|  | agnt (A: attack, X), |
|  | N1 (R, A), |
|  | means(R, T1) |
| }. | |

10.0 References.

Bryan, M. (1988). SGML—An author's guide to the Standard Generalized Markup Language (SGML). Reading, Mass.: Addison Wesley.

Hobbs, J. R. et al. (1992). SRI International: Description of the FASTUS system used for MUC-4. In Proceedings of Fourth Message Understanding Conference, Morgan Kaufman Publishers.

Lenat, D. B. and Guha, R. V. (1989). Building Large Knowledge-Based Systems. Addison-Wesley, Reading, Mass.

Liddy, E. D., Paik, W., Yu, E. S., and McKenna, M. (1994). Document Retrieval using Linguistic Knowledge. Proceedings of RIAO '94 Conference. Miller, George A. (1995). WordNet: A Lexical database for English. Communications of the ACM.

Sager, N., Friedman, C, and Lyman, M. S. (1987). Medical Language Processing: Computer Management of Narrative Data. Reading, Mass.: Addison-Wesley.

Sleator, Daniel, and Temperley, D. (1993). Parsing English with a Link Grammar, Third International Workshop on Parsing Technologies.

Sowa, John F. (1984). *Conceptual Structures : Information Processing in Mind and Machine.* Addison-Wesley Publishing Company, Reading, Mass.

11.0 Conclusion

The first generation of information extraction (IE) systems was demonstrated in the second and the third Message Understanding Conferences (MUC). Examples of these early systems are SRI International's TACITUS, General Electric's NLToolset, and New York University's PROTEUS systems. These systems performed deep preprocessing, syntactic analysis, and pragmatic analysis (Hobbs 1992). They used more or less full syntactic parsers, and produced reasonably high precision but low recall and were very slow.

Second generation IE systems began to emerge with the success of University of Massachusetts' CIRCUS system.

SRI International's FASTUS system, which was first demonstrated in the third MUC, is representative of these. Second generation systems have dominated succeeding MUCs. These systems were an improvement over first generation IE systems in performance and processing speed. However, the adaptation process to a new domain is still lengthy-from a few weeks to several months. Thus, given that there are an infinite number of subject domains, it does not seem feasible to build domain dependent IE systems one domain at a time.

In the context of this history, CHESS using a redundant text corpus represents the third generation of information extraction systems. The fourth generation, which is capable of extracting information from a non-redundant corpus, is represented by the enhanced CHESS system which includes the syntactic parser/syntactic to semantic mapper modules.

CHESS automatically extracts domain independent timestamped information from text by extracting information about named entities and other concepts. CHESS can extract this information from a corpus of redundant text, such as a collection of newspaper articles, by searching for apposition phrases, relative clauses or copula sentences. CHESS assumes that in a large collection such as a newspaper database that the linguistic constructions on which it is based-the appositional, copula, and relative clause constructions-will eventually be used in describing information concerning subjects such as people, places, or organizations. The addition of the syntactic parser, syntactic to semantic mapper and the Mapping Rule Base broadens this ability to extract information from non-redundant text such as instructional manuals or conversation.

Enhanced CHESS was developed to satisfy the need for a domain-independent information-extraction system which is suited to text-types which contain only sparse duplication of content. Since there is a preponderance of information of this sort and since such a system obviates the necessity for building a different information-extraction system for every subject domain, there has been an enormous need for developing a fourth generation information extraction system. Another limitation of previous systems is that the tasks of surveying and revising the information-extraction rule base had to be performed by experts in the fields of linguistics/information science. CHESS offers a system which automatically extracts information from texts of any type and subject on the basis of general information about grammatical functions and lexical markers. Thus it can be seen that the present invention provides a question answering system which goes beyond information retrieval systems in that it is no longer circumscribed by the boundaries of documents, and it extracts and stores information in intelligent building blocks which contain more than the standard single words, phrases, or concepts. This system can be used across domains with no initial manual input. It creates its own knowledge base. It is particularly suited to extracting chronologically based information such as biographical or event sequence information. Thus, it can be used to monitor events, current situations, or detect trends.

While the above is a complete description of specific embodiments of the invention, various modifications, alternative constructions, and equivalents may be used. For example, other possible embodiments include the building of encyclopedic knowledge collections, the application of the system to scenario analysis during emergencies, or the building of ontologies to mine the data in large knowledge bases.

Therefore, the above description should not be taken as limiting the scope of the invention as defined by the claims.

What is claimed is:

1. A computer program product for preparing a set of documents to support information extraction, the computer program product comprising:
    code for defining a set of concepts;
    code for defining relations between the concepts, the rations including monadic relations associated with single concepts and dyadic relations between concepts;
    code for defining a set of rules that allow extraction of relations;
    code for receiving a plurality of documents;
    code for parsing the documents to identify concepts;
    code for extracting, by applying the set of rules to the parsed documents, concept-relation-concept triples (CRCs) and relation-concept pairs RCs) from the parsed documents;
    code for incorporating the CRCs and RCs into a data organization; and
    a computer readable medium for storing the codes.

2. The computer program product of claim 1 wherein:
    said code for parsing includes code for applying a syntactic parser;
    said rules include a set of mapping rules; and
    said code for extracting includes code for mapping syntactic relations to semantic relations using said set of mapping rules.

3. The computer program product of claim 1 further comprising code for indexing the CRCs based on features of the CRCs including their concepts and their relations.

4. The computer program product of claim 1 wherein said set of rules includes a set of category-specific syntactic constructs.

5. The computer program product of claim 4 wherein said set of category-specific syntactic constructs includes coreferential proper names.

6. The computer program product of claim 1 wherein said set of rules includes a set of lexical constructs that imply a particular relation.

7. The computer program product of claim 1 wherein said code for parsing the documents to identify concepts includes code selectable from codes for determining phrase boundaries, determining parts of speech, identifying numeric concepts, identifying phrasal verbs, identifying idioms, and identifying proper names.

8. The computer program product of claim 1 wherein each CRC that is incorporated into the data organization includes an indication of the date, if any, of the document from which the CRC was extracted.

9. The computer program product of claim 1 further comprising code, executed in response to a user request, for
    extracting time-related information from a set of CRCs to create a timeline which describes the history of any concept over a specified period.

10. The computer program product of claim 1 wherein at least some of said documents are labeled by at least one of the group consisting of source reliability, source credibility, and source reputation.

11. The computer program product of claim 1 wherein at least some of said CRCs include at least one embedded CRC to provide a chain.

12. The computer product of claim 1, further comprising:
    code for accepting a query;
    code for parsing the query to identify concepts;
    code for applying the set of rules to the parsed query to extract CRCs; and code for extracting from the data organization a set of CRCs that match in at least one regard the CRCs extracted from the query.

13. The computer program product of claim 12 wherein said query is a "Who-What Where-When-Why-How" question.

14. The computer program product of claim 12 further comprising code for displaying extracted CRCs as a knowledge representation.

15. The computer program product of claim 14 wherein the knowledge representation is one of the group consisting of a conceptual graph, a semantic network, and a frame.

16. The computer program product of claim 12 further comprising code for filtering the set of retrieved CRCs according to user input.

17. The computer program product of claim 12 wherein frequency and/or recency of a CRC is used to filter or limit the number of documents reported.

18. The computer program product of claim 1 further comprising:

code for accepting a browsing request specifying a class of CRCs to browse;

in response to the browsing request, code for extracting from the data organization a set of CRCs that match the class of CRCs; and code for displaying the results in a hypertext display of active information nodes to allow user to explore a broad idea rather than create a W-H query.

19. A computer program product for preparing a set of documents to support information extraction, the computer program product comprising:

code for defining a set of concept categories;

code for defining a set of dyadic relations between concepts;

code for defining a set of rules that allow extraction of relations between concepts;

code for receiving a corpus containing documents;

code for parsing the documents to identify concepts;

code for extracting, by applying the set of rules to the parsed documents, concept-relation-concept triples, referred to as CRCs, from the parsed documents, said extracting includes mapping syntactic relations to semantic relations using said set of rules;

code for incorporating the CRCs into a data organization; and a computer readable medium for storing the codes.

20. A computer program product for preparing a set of documents to support information extraction, the computer program product comprising:

code for defining a set of concept categories;

code for defining a set of dyadic relations between concepts;

code for defining a set of rules that allow extraction of relations between concepts;

code for receiving a corpus containing documents;

code for parsing the documents to identify concepts;

code for extracting, by applying the set of rules to the parsed documents, concept-relation-concept triples, referred to as CRCs, from the parsed documents;

code for incorporating the CRCs into a data organization;

code for extracting time-related information from a set of CRCs to create a timeline which describes the history of any concept over a specified period; and a computer readable medium for storing the codes.

* * * * *